(12) United States Patent
Muratoglu et al.

(10) Patent No.: US 10,696,802 B2
(45) Date of Patent: Jun. 30, 2020

(54) PVA HYDROGELS HAVING IMPROVED CREEP RESISTANCE, LUBRICITY, AND TOUGHNESS

(71) Applicant: THE GENERAL HOSPITAL CORPORATION, Boston, MA (US)

(72) Inventors: Orhun K. Muratoglu, Cambridge, MA (US); Hatice Bodugoz-Senturk, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 99 days.

(21) Appl. No.: 15/938,036

(22) Filed: Mar. 28, 2018

(65) Prior Publication Data

US 2018/0291158 A1    Oct. 11, 2018

Related U.S. Application Data

(62) Division of application No. 12/597,050, filed as application No. PCT/US2008/061250 on Apr. 23, 2008, now abandoned.

(60) Provisional application No. 60/913,415, filed on Apr. 23, 2007.

(51) Int. Cl.
   *C08J 3/075*   (2006.01)
   *C08F 261/04*  (2006.01)
   *C08F 283/00*  (2006.01)

(52) U.S. Cl.
   CPC .......... *C08J 3/075* (2013.01); *C08F 261/04* (2013.01); *C08F 283/00* (2013.01); *C08J 2205/022* (2013.01); *C08J 2329/04* (2013.01)

(58) Field of Classification Search
   None
   See application file for complete search history.

(56) References Cited

U.S. PATENT DOCUMENTS

| 4,663,358 A | 5/1987 | Hyon et al. |
| 5,522,898 A | 6/1996 | Bao |
| (Continued) | | |

FOREIGN PATENT DOCUMENTS

| WO | 2006125082 A2 | 11/2006 | |
| WO | WO-2006132661 A1 * | 12/2006 | ............. A61L 27/52 |

OTHER PUBLICATIONS

Bodugoz-Senturk, et al., The Effect of Polyethylene Glycol on the Stability of Pores in Polyvinyl Alcohol Hydrogels During Annealing, Biomaterials, 2008, 29(2):141-149.

(Continued)

*Primary Examiner* — Satya B Sastri
(74) *Attorney, Agent, or Firm* — Quarles & Brady LLP

(57) ABSTRACT

The invention provides creep resistant, lubricious and tough PVA-PAAm-hydrogels, creep resistant, lubricious, tough PVA-PAAm-hydrogel-containing compositions, and methods of making the same. The invention also provides methods of implanting or administering the creep resistant, lubricious and tough PVA-PAAm-hydrogels, or the PVA-PAAm-hydrogel-containing compositions to treat a subject in need. Methods of cross-linking pre-solidified or pre-gelled hydrogel particles and making cross-linked PVA-PAAm-hydrogels, and cross-linked PVA-PAAm-hydrogel-containing compositions also are disclosed herein.

19 Claims, 8 Drawing Sheets

(56) References Cited

U.S. PATENT DOCUMENTS

| | | | |
|---|---|---|---|
| 5,705,780 A * | 1/1998 | Bao | C08F 6/24 |
| | | | 204/157.15 |
| 5,981,826 A | 11/1999 | Ku et al. | |
| 6,855,165 B2 | 2/2005 | Fell et al. | |
| 6,866,684 B2 | 3/2005 | Fell et al. | |
| 6,911,044 B2 | 6/2005 | Fell et al. | |
| 6,923,831 B2 | 8/2005 | Fell et al. | |
| 9,394,384 B2 * | 7/2016 | Muratoglu | A61L 27/52 |
| 2003/0044585 A1 | 3/2003 | Taylor et al. | |
| 2003/0232895 A1 | 12/2003 | Omidian et al. | |
| 2004/0092653 A1 | 5/2004 | Ruberti et al. | |
| 2004/0171740 A1 | 9/2004 | Ruberti et al. | |
| 2004/0220296 A1 | 11/2004 | Lowman et al. | |
| 2005/0049323 A1 | 3/2005 | Gvozdic | |
| 2006/0079597 A1 * | 4/2006 | Muratoglu | C08J 3/28 |
| | | | 522/178 |
| 2006/0083773 A1 * | 4/2006 | Myung | A61F 2/142 |
| | | | 424/427 |
| 2010/0210752 A1 | 8/2010 | Muratoglu et al. | |

OTHER PUBLICATIONS

Gong, et al., Double-Network Hydrogels with Extremely High Mechanical Strength, Advanced Materials, 2003, 15(14):1155-1158.

Tanaka, et al., Novel Hydrogels With Excellent Mechanical Performance, Progress in Polymer Science, 2005, 30:1-9.

PCT International Search Report and Written Opinion, PCT/US2008/061250, dated Jul. 18, 2008, 7 pages.

\* cited by examiner

Figures 4A, 4B, and 4C.

Figure 5.
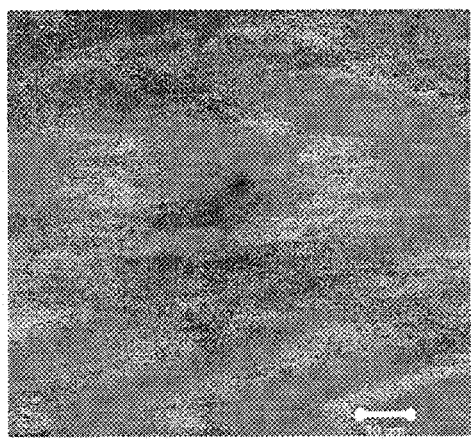
15-0 PVA- AAm
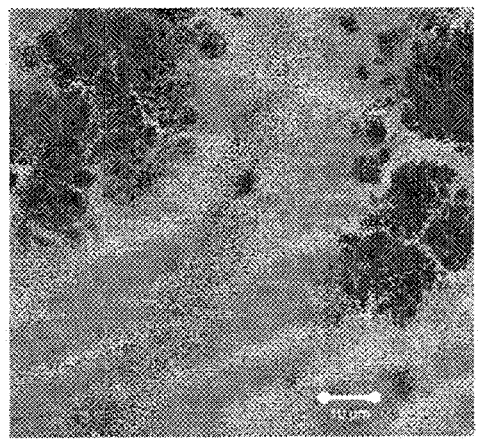
15-5 PVA- AAm
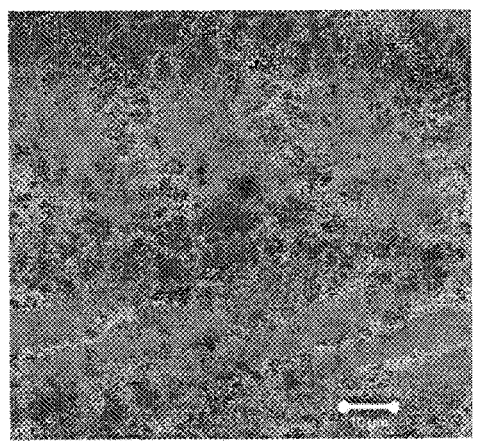
15-10 PVA- AAm
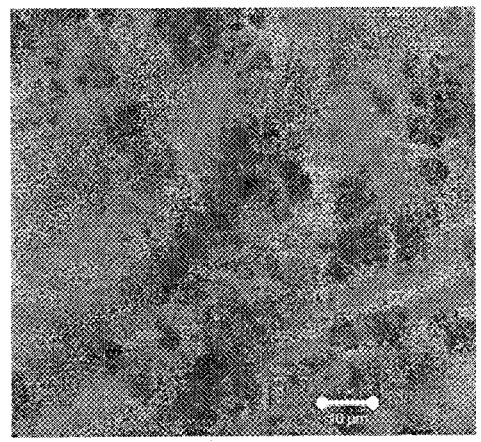
15-15 PVA- AAm Figure 6.
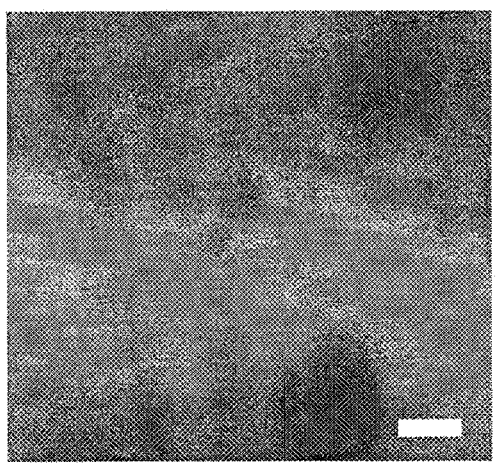
15-0 PVA- AAm
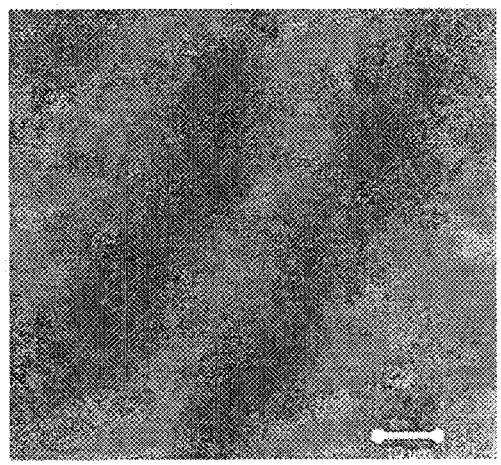
15-5 PVA- AAm
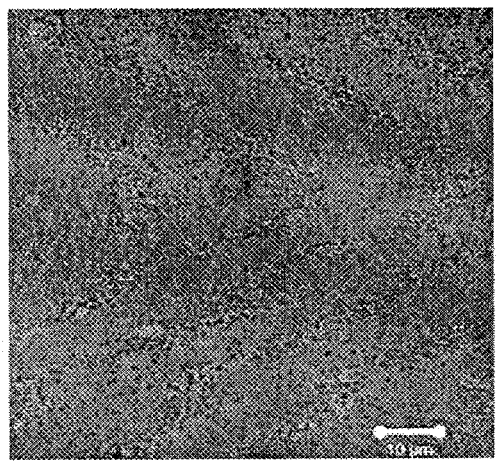
15-10 PVA- AAm
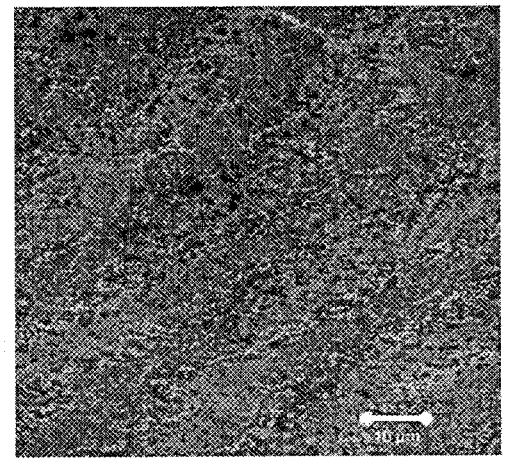
15-15 PVA- AAm

PVA HYDROGELS HAVING IMPROVED CREEP RESISTANCE, LUBRICITY, AND TOUGHNESS

CROSS-REFERENCES TO RELATED APPLICATIONS

This application is a divisional application of U.S. patent application Ser. No. 12/597,050 filed Dec. 22, 2009, which is a 371 of PCT/US08/61250 filed Apr. 23, 2008, which claims priority to U.S. Provisional Application Ser. No. 60/913,415, filed Apr. 23, 2007. The entirety of these applications are hereby incorporated by reference.

FIELD OF THE INVENTION

The invention relates to creep resistant, lubricious and tough PVA-PAAm-hydrogels, creep resistant, lubricious and tough PVA-PAAm-hydrogel-containing compositions, and methods of making fabricated PVA-PAAm-hydrogels and PVA-PAAm-hydrogel-containing compositions. The invention also relates to methods of using the fabricated creep resistant, lubricious and tough PVA-PAAm-hydrogels and creep resistant, lubricious and tough PVA-PAAm-hydrogel-containing compositions for cartilage repair or as interpositional devices that require mechanical integrity, high water content, and excellent lubricity in order to fully function under the high stress environment in the joint space and withstand high loads of human joints.

BACKGROUND OF THE INVENTION

Biocompatible hydrogels for cartilage repair or as interpositional devices require mechanical integrity, high water content, and excellent lubricity to fully function under the high stress environment in the human joint spaces. PVA hydrogels are good candidates for such purposes, but currently available formulations do not provide enough mechanical strength, creep resistance, and lubricity compatible to that of natural articular cartilage.

Most hydrogels systems available for articular cartilage repair or replacement applications do not have required mechanical strength to withstand the high loads of the human joint. Various dehydration methods, described below, can be used together in combinations to alter the properties of hydrogels.

Solvent dehydration of hydrogels is described by Bao (U.S. Pat. No. 5,705,780). Bao describes immersion of PVA hydrogel into solvents such as ethanol/water mixture at room temperature to dehydrate PVA hydrogel without shape distortion.

Hyon and Ikada (U.S. Pat. No. 4,663,358) and Bao (U.S. Pat. No. 5,705,780) describe the use of water and organic solvent mixture to dissolve PVA powder and subsequently cooling the solution below room temperature and heating back up to room temperature to form a hydrogel. The hydrogel is then immersed in water to remove the organic solvent. Hyon and Ikada claim that PVA hydrogels thus formed are transparent, as opposed to the ones formed by freeze-thaw method that uses water only as the solvent to dissolve the PVA powder.

Bao (U.S. Pat. No. 5,522,898) describes dehydration methods that use air dehydration, vacuum dehydration, or partial humidity dehydration to control the rate of dehydration and prevent shape distortion of PVA hydrogels for use as prosthetic spinal devices to replace the nucleus pulposus. The starting gels of Bao are the freeze-thaw gels described in the U.S. Pat. No. 5,705,780.

Ku et al. (U.S. Pat. No. 5,981,826) describes a freeze-thaw method to form a PVA hydrogel by subjecting a PVA aqueous solution to freeze-thaw followed by immersion in water and additional cycles of freeze-thaw while immersed in water.

The creep resistance of PVA is currently achieved in the field by reducing the equilibrium water content (EWC) of the hydrogel, which also reduces the lubricity of the hydrogel. Therefore, there remains long felt but an unmet needs for a creep resistant, lubricious and tough PVA-hydrogel, which also would retain the lubricity. Such creep resistant, lubricious and tough PVA-PAAm-hydrogels and methods of making such compositions were not known until the instant invention.

SUMMARY OF THE INVENTION

The present invention relates generally to creep resistant, lubricious and tough PVA-PAAm-hydrogels, PVA-PAAm-hydrogel-containing compositions, and methods of making PVA-PAAm-hydrogels and PVA-PAAm-hydrogel-containing compositions. The invention also relates to methods of using the creep resistant, lubricious and tough PVA-PAAm-hydrogels and creep resistant, lubricious and tough PVA-PAAm-hydrogel-containing compositions in treating a subject in need, for example, for articular cartilage repair or replacement that require mechanical integrity, high water content, excellent lubricity to fully function under the high stress environment in the joint space and withstand high loads of human joints.

One aspect of the invention provides methods of making a creep resistant, lubricious and tough PVA-PAAm-hydrogel comprising: a) contacting an aqueous solution of poly(vinyl alcohol) (PVA) with an aqueous solution of acrylamide monomer (AAm) solution in presence of an initiator, thereby forming a PVA-AAm solution; b) heating or irradiating the PVA-AAm solution, thereby forming an inter-penetrating network (IPN) structure of polymerized PAAm in the PVA solution; and c) subjecting the PVA-PAAm IPN to at least one or more freeze-thaw cycles, thereby forming a tough PVA-PAAm hydrogel. According to another aspect of the invention, the method of making a creep resistant, lubricious and tough PVA-PAAm-hydrogel further comprising: a) dehydrating the tough PVA-PAAm hydrogel in a vacuum, thereby increasing the melting point of the PVA-PAAm hydrogel; b) annealing the dehydrated PVA-PAAm hydrogel at a temperature below the melting point of the dehydrated PVA-PAAm hydrogel; and c) re-hydrating the PVA-PAAm hydrogel, thereby forming a creep resistant, lubricious and tough PVA-PAAm-hydrogel.

Another aspect of the invention provides methods of making a creep resistant, lubricious and tough PVA-PAAm-hydrogel comprising: a) contacting an aqueous solution of poly(vinyl alcohol) (PVA) with an aqueous solution of poly(acrylamide) (PAAm), thereby forming a homogenous PVA-PAAm solution; and b) subjecting the PVA-PAAm solution to at least one or more freeze-thaw cycles, thereby forming a tough PVA-PAAm hydrogel. According to another aspect of the invention, the method of making a creep resistant, lubricious and tough PVA-PAAm-hydrogel further comprising: a) dehydrating the tough PVA-PAAm hydrogel at room temperature in a vacuum, thereby increasing the melting point of the PVA-PAAm hydrogel; b) annealing the dehydrated PVA-PAAm hydrogel at a temperature below the melting point of the dehydrated PVA-PAAm hydrogel; and c) re-hydrating the PVA-PAAm hydrogel, thereby forming a creep resistant, lubricious and tough PVA-PAAm-hydrogel.

Another aspect of the invention provides methods of making a creep resistant, lubricious and tough PVA-PAAm-hydrogel comprising: a) contacting an aqueous solution of poly(vinyl alcohol) (PVA) with an aqueous solution of poly(acrylamide) (PAAm), thereby forming a homogenous PVA-PAAm solution; b) pouring the PVA-PAAm solution onto a mold (optionally pre-heated); c) cooling the PVA-PAAm-hydrogel by freezing at a temperature below 0° C.; d) thawing the PVA-PAAm-hydrogel to a temperature above 0° C.; and e) dehydrating PVA-PAAm-hydrogel at room temperature in a vacuum. According to another aspect of the invention, the method of making a creep resistant, lubricious and tough PVA-PAAm-hydrogel further comprising: a) annealing the dehydrated PVA-PAAm hydrogel at a temperature below the melting point of the dehydrated PVA-PAAm hydrogel; and b) re-hydrating the PVA-PAAm hydrogel, thereby forming a creep resistant, lubricious and tough PVA-PAAm-hydrogel.

According to another aspect, the invention provides methods as described above, wherein the hydrogel comprises PVA-PAAm-hydrogel, wherein the hydrogel comprises water and/or one or more other ingredients. The ingredient is PAAm, polyethylene glycol (PEG), and/or salt, proteoglycan, water soluble polymer, amino acid, alcohol, DMSO, water soluble vitamins, such as vitamin C, or vitamin E, wherein in the ingredients is partially or completely soluble in water.

According to another aspect, the ingredient is PAAm, and/or salt, proteoglycan, water soluble polymer, amino acid, alcohol, DMSO, water soluble vitamins, such as vitamin C, or vitamin E, wherein in the ingredients is partially or completely soluble in water.

According to another aspect, the ingredient is PEG, wherein the PEG is in a solution of water, ethanol, ethylene glycol, DMSO, or another suitable solvent.

According to another aspect, the ingredient is non-volatile.

According to another aspect, the ingredient is at least partially miscible in water.

According to another aspect, the ingredient is selected from the group consisting of PEG, salt, NaCl, KCl, $CaCl_2$, vitamins (such as vitamin E, vitamin C), carboxylic acids, hydrocarbons, esters, and amino acids, PEG of different molecular weights or a blend of PEGs of different molecular weights, or any combination of the above.

According to another aspect, the water miscible polymer is PEO, Pluronic, amino acids, proteoglycans, polyacrylamide, polyvinylpyrrolidone, polysaccharides, dermatin sulfate, keratin sulfate, chondroitin sulfate, or dextran sulfate, or any combination of the above.

According to another aspect, the dehydration is carried out by placing the hydrogel in: a) a non-solvent, wherein i) the non-solvent is PEG, alcohols, acetones, saturated salinated water, vitamin, or carboxylic acid, aqueous solution of a salt of an alkali metal, or a combination thereof, and ii) the non-solvent contains more than one ingredient including water, PEG, vitamin, polymer, ester, proteoglycan, and carboxylic acid, or b) in a supercritical fluid.

According to another aspect, the dehydration is carried out by leaving the PVA-PAAm-hydrogel in a vacuum at room temperature or at an elevated temperature, for example, at about 40° C., above about 40° C., about 80° C., above 80° C., about 90° C., about 100° C., above 100° C., about 150° C., about 160° C., above 160° C., about 180° C., about 200° C., or above 200° C.

According to another aspect, the dehydration is carried out by heating the hydrogel in air or inert gas to elevated temperature, wherein the heating rate is slow or fast or the heating follows the vacuum or air dehydration.

According to another aspect, the dehydrated hydrogel is re-hydrated by placing the dehydrated hydrogel: i) in water, saline solution, Ringer's solution, salinated water, buffer solution, and the like, or a combination thereof, ii) in a humid chamber, or iii) at room temperature or at an elevated temperature.

According to another aspect, the PVA-PAAm-hydrogels made by above disclosed methods are re-hydrated to reach an equilibrium, wherein the PVA-PAAm-hydrogels are re-hydrated in water or a salt solution.

In another aspect, the invention provides medical implants comprising a PVA-PAAm-hydrogel, for example, an interpositional device, wherein the interpositional device a unispacer, wherein the unispacer is a free floating articular implant in human joints such as a knee, a hip, a shoulder, an elbow, or an upper or an extremity joint or the intervertabral space in the spine.

Unless otherwise defined, all technical and scientific terms used herein in their various grammatical forms have the same meaning as commonly understood by one of ordinary skill in the art to which this invention belongs. Although methods and materials similar to those described herein can be used in the practice or testing of the present invention, the preferred methods and materials are described below. In case of conflict, the present specification, including definitions, will control. In addition, the materials, methods, and examples are illustrative only and are not limiting.

Further features, objects, advantages, and aspects of the present invention are apparent in the claims and the detailed description that follows. It should be understood, however, that the detailed description and the specific examples, while indicating preferred aspects of the invention, are given by way of illustration only, since various changes and modifications within the spirit and scope of the invention will become apparent to those skilled in the art from this detailed description.

BRIEF DESCRIPTION OF THE DRAWINGS

FIG. 4A shows 90° C. degree polymerization; FIG. 4B demonstrates two step polymerization at 55° C. and 65° C.; and FIG. 4C presents 15% PVA-10% PAAm vacuum dehydrated, annealed and re-hydrated in de-ionized (DI) water—two step polymerization (the scale bar is 10 μm).

FIG. 5 depicts the confocal images of non-annealed PVA-PAAm IPNs prepared by Method 6 followed by re-hydration.

FIG. 6 depicts the confocal images of annealed PVA-PAAm IPNs prepared by Method 6 followed by re-hydration.

DETAILED DESCRIPTION OF THE INVENTION

Figure 1:
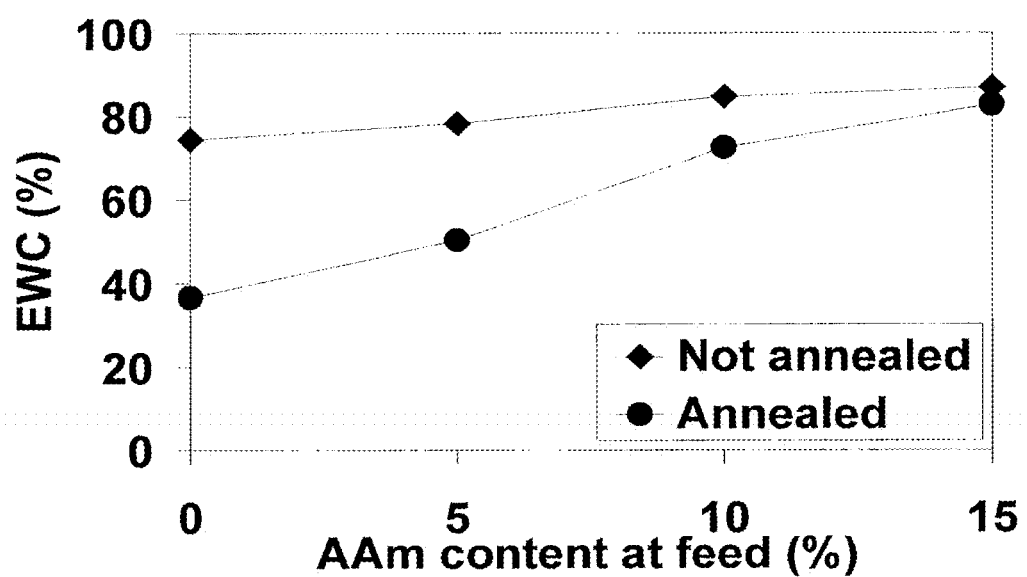
FIG. 1 shows EWC of annealed and non annealed Polyvinyl alcohol-acrylamide IPNs form prepared by Method 6 followed by re-hydration.

The present invention provides creep resistant, lubricious and tough PVA-PAAm-hydrogels, creep resistant, lubricious and tough PVA-PAAm-hydrogel-containing compositions, and methods of making fabricated PVA-PAAm-hydrogels and PVA-PAAm-hydrogel-containing compositions. The invention also provides methods of using the fabricated creep resistant lubricious tough PVA-PAAm-hydrogels and creep resistant, lubricious and tough PVA-PAAm-hydrogel-containing compositions for cartilage repair or as interpositional devices that require mechanical integrity, high water content, and excellent lubricity in order to fully function under the high stress environment in the joint space and withstand high loads of human joints.

Tough hydrogels are desirable for applications in cartilage repair and as interpositional devices. Toughening of a given hydrogel system often results in increased solid content and as a result decreased water content, which may not be desirable for certain applications where lubricity imparted by water in the hydrogel, is compromised. One method of toughening hydrogels is through annealing, which increases the creep resistance of PVA but also reduces the equilibrium water content (EWC). The invention provides that by adding a hydrophilic compound, such as poly(acrylamide) (PAAm) into PVA and annealing that mixture, the creep resistance can be increased while maintaining a high level of EWC. PAAm has a hydrophilic nature and high water uptake capability. The PVA-PAAm hydrogels that are prepared according to the invention disclosed herein are very tough, very creep resistant, and very lubricious.

Increasing EWC is beneficial to increase lubrication between the hydrogel and counterface that it will be articulating against in vivo, such as bone, cartilage, metallic or ceramic surfaces, or polymeric materials. The addition of PAAm is not limited to the PVA host or base polymer; it can be used with other hydrogel systems as well. Copolymers and blends of poly(acrylamide), such as polyacrylamide/Acrylamido-methylpropanesulfonic acid could be prepared using PVA as a host or base polymer or without PVA. It is generally expected that with addition of ionic groups, PAAm hydrogel becomes a stimuli response system in which the swelling behavior of hydrogels is affected by environmental conditions such as temperature, ionic strength, and pH of the swelling medium.

The PVA-PAAm hydrogels can be prepared by a number of methods, as disclosed herein to the skilled person. One method is to mix the PVA solution with acrylamide monomer solution containing an initiator (for example, thermal initiators such as nitriles (for example, azobisisobutyronitrile) and persulfates (for example, ammonium persulfate), peroxides (for example, benzoyl peroxide); photoinitiators (for example, glutaric acid)) and a catalyst (base or acids, for example, hydrochloric acid (HCl), sodium hydroxide (NaOH), buffer solutions like phosphate buffers), which polymerizes and/or cross-links the AAm in the PVA solution. The polymerization of the PAAm in the PVA solution can be achieved by applying heat or irradiation. This results in an inter-penetrating network (IPN) structure of PVA-PAAm.

According to one embodiment of the invention, the network is polymerized to a lower degree and the PVA/PAAm IPN is subjected to freeze-thaw treatment, which increases the toughness of the IPN. This network (IPN) structure can be irradiated to introduce some cross-linking into the structure or a cross-linking agent can be added to the acrylamide solution even before polymerization.

Another method is to blend the PVA and PAAm in a solution to form a polymer blend and cause the blended PVA-PAAm solution to gel by at least one or more freeze-thaw cycle, cooling to room temperature, radiation cross-linking or chemical cross-linking, or thermal polymerization and crosslinking in the presence of initiator or initiator systems (as mentioned above) and a cross-linking agent, such as methylene bis acrylamide.

According to another embodiment, in both methods mentioned above, the resulting network can be subjected to room temperature gelation after forming a mixture with PVA and AAm or PAAm at higher temperatures. According to this procedure a bad solvent (for example, PEG) is added to PVA and PAAm or AAm mixture at high temperature and the resulting solution is cooled down to room temperature to form a gel. Additional freeze-thaw, irradiation and thermal polymerization (in case of AAm monomer) can be applied after room temperature gelation to introduce cross-linking and crystalline regions into network.

According to another embodiment, after all of the above mentioned methods, a dehydration and annealing step is applied to form a mechanically strong hydrogel.

The gelation steps described above increase the mechanical strength of the IPN or polymer blends. To further increase the mechanical strength, the IPN hydrogel or polymer blend hydrogel is heated. Heating temperature, environment, duration is varied to tailor the mechanical strength of the IPN or the polymer blend for a specific application. If the heating temperature is above the melting point of the IPN hydrogel or polymer blend hydrogel then a dehydration step is used to elevate the melting point to above the heating temperatures of the IPN hydrogel or polymer blend hydrogel.

Dehydration can be achieved by a variety of methods, for example, slow heating, vacuum dehydration, solvent dehydration, and other methods known in the art. For some applications, dehydration followed by rehydration may be sufficient to obtain the desired mechanical properties and annealing may not be necessary in that process.

According to one embodiment of the invention, the mechanical properties of the IPN hydrogel or polymer blend hydrogel can be tailored by changing the ratio of PVA to PAAm and/or by changing the extent of cross-linking induced by the chemical and/or the ionizing radiation routes.

According to one embodiment of the invention, the creep resistant, lubricious and tough PVA-PAAm-hydrogels contains 60-90% EWC while maintaining a creep resistance of 10-30%.

In one embodiment, the IPN or the polymer blend is mixed with a gellant such as PEG at an elevated temperature so as to cause gelation of the system upon cooling down to room temperature.

In another embodiment, the IPN or the polymer blend is subjected to freeze-thaw method to cause gelation.

In another embodiment, the IPN or the polymer blend is subjected to radiation cross-linking.

In another embodiment, the PVA used in the preparation of the IPN or the polymer blend is subjected to radiation cross-linking.

In another embodiment, the hydrogel IPN or the hydrogel polymer blend is annealed at an elevated temperature. In some embodiments the hydrogel is first dehydrated prior to annealing. Dehydration can be done through a number of methods such as, vacuum dehydration, solvent dehydration (by soaking in PEG, IPA, ethanol, methanol, and the like), and other methods known in the art.

In one embodiment, interpenetrating polymer network (IPN) hydrogel based on acrylamide can be prepared by pre-solution polymerization using azobisisobutyronitrile (AIBN) initiator with or without cross-linker system (methylene-bisacrylamide (MBA)) and subsequent freeze-thawing method in the presence of poly(vinyl alcohol) PVA.

In another embodiment, the polymer blend can be prepared in a compounder.

In another embodiment, the acrylamide monomer (AAm), PVA, and water is blended in a compounder with the initiator and catalyst and the polymerization of the PAAm is carried out in the compounder. Alternatively, the blend can be prepared, molded into a desired shape and the polymerization of the acrylamide can be carried out by heating the shaped article.

In another embodiment, PVA hydrogel is doped by diffusion of acrylamide monomer (AAm) mixed with a catalyst (base or acids, for example, hydrochloric acid (HCl), sodium hydroxide (NaOH), buffer solutions like phosphate buffers) and an initiator, for example, nitriles (azobisisobutyronitrile, (AIBN)) or persulfates (ammonium persulfate (APS)), peroxides (benzoyl peroxide), photo-initiators such as glutaric acid)). The doped PVA hydrogel is then heated or irradiated to initiate the polymerization reaction of the acrylamide monomer (AAm).

In another embodiment doping of PVA hydrogel is carried out by diffusion of PAAm into PVA.

In yet another embodiment, a PVA solution is subjected to one or more freeze-thaw cycles and the resulting hydrogel is immersed in an acrylamide and an initiator solution. The monomer infused gel is then kept at an elevated temperature (for example, 65° C.) for some time (for example, 8 hours or longer) for the polymerization of the acrylamide. This process forms a PVA-PAAm IPN structure. Alternatively, the IPN can be subjected to additional freeze-thaw cycles (for example, more than one cycle, preferably two cycles, or more). The resulting hydrogel can be subjected to annealing in order to further improve its toughness. Optionally, before annealing the hydrogel can be hydrated using solvent or vacuum dehydration methods. The residual monomer can be removed either before or after freeze thaw, or alternatively after dehydration or annealing.

In another embodiment, a 15-28 PVA-PEG theta-gel is dePEGed by immersing in water or de-ionized (DI) water and then immersed in an acrylamide and an initiator solution. The monomer infused gel is then kept at an elevated temperature (for example, 65° C.) for some time (for example, 8 hours or longer) for the polymerization of the acrylamide. This process forms a PVA-PAAm IPN. Alternatively, the IPN can be subjected to additional freeze-thaw cycles (for example, more than 1 cycle, preferably 2 cycles, or more). The resulting hydrogel can be subjected to annealing to further improve its toughness. Optionally, before annealing the hydrogel can be hydrated using solvent or vacuum dehydration methods. The residual monomer can be removed either before or after freeze thaw, or alternatively after dehydration or annealing.

According to one embodiment of the invention, a second polymer is incorporated by physically blending with PVA and/or chemically tethering the molecules of the second polymer to PVA molecules in the hydrogel. The second polymer also can be polymerized in the presence of PVA molecules. A number of post-processing methods such as freeze-thaw, vacuum dehydration, solvent dehydration, heating, also can be used.

Increased hydrophilicity achieved by the addition of this second polymer results in increased water uptake, which improves surface lubricity of the PVA hydrogels. In cases where the second polymer has high ionic strength, electrostatic repulsion provides increased elasticity under compressive or tensile loading, similar to cartilage. The second polymer also can have chemical functional groups that can cross-link with each other or with the PVA molecules to form an interpenetrating network to reinforce the original PVA network structure. Polymers with weak acid or weak base functional groups also can be used to impart pH-sensitivity to the originally non-ionic PVA hydrogels. This is useful for pH-induced volume transition and complexation with dyes, drugs, and/or biological molecules.

In another embodiment, the invention provides methods of designing such systems. With PVA hydrogels as a base hydrogel system, the newly incorporated hydrophilic entities are macromolecules with ionic chemical functionality and/or hydrogen bonding capability, namely, poly(acrylamide) (PAAm), copolymers of poly(acrylamide) and poly(acrylic acid), poly(acrylamide)-co-poly(acrylic acid) and poly(allylamine hydrochloride) (PAH), copolymers of PVA-PAAm, copolymers of poly(ethylene oxide) and poly(acrylamide), poly(ethylene oxide)(PEO)-PAAm copolymer, poly(ethylene glycol), hyaluronic acid (HA), acids such as sulfonic acids (for example poly(acrylamido-methylpropane sulfonic acid)) and polyvinylpyrrolidone (PVP). The base hydrogel system in some of the embodiment is a copolymer of poly(ethylene) and poly(acrylic acid), poly(ethylene)-co-poly(acrylic acid) copolymer, a copolymer of poly(ethylene) and PVA, poly(ethylene)-co-poly(vinyl alcohol), a copolymer of poly(ethylene) and poly(acrylamide), poly(ethylene)-co-poly(acrylamide), or mixtures thereof with PVA; and the same hydrophilic entities listed above are incorporated into these base hydrogel systems. Methods for incorporating the new hydrophilic moieties include blends with the base hydrogel before gel formation and diffusion into the base hydrogel after gel formation. Methods for stabilizing the introduced new moieties inside the original gel network include, chemical cross-linking, irradiation, dehydration, and/or thermal treatment and combinations thereof. The incorporation of the second polymer in the base hydrogel can be non-uniform to impart, for example, non-uniform gradient properties to the final implant, such as different water content, creep strength, mechanical properties, and cross-link density, and the like.

The base hydrogel can be fabricated using any known method of gelation such as the methods of freeze thaw, theta-gel, radiogel, or chemical crosslinking. Some of the base hydrogels, for instance PVA, can be formed by single or multiple times freezing and thawing of the aqueous solution of the base hydrogel. Alternatively, the base hydrogel solution is mixed with a bad solvent (for instance PVA solution mixed with PEG) and gelation is carried out by cooling to below the critical solution temperature (in the case of PVA/PEG cooling the aqueous solution of the mixture to below 60° C.). The radiogel method for gelation of the base hydrogel is to radiation polymerize and/or crosslink the base hydrogel solution either in the presence or absence of an initiator and/or a crosslinking agent. For instance a PVA aqueous solution is irradiated with electron beam or gamma radiation to form a PVA hydrogel. The radiation dose level can be between 1 kGy and 1000 kGy and the irradiation is carried out in air or in inert gas. For example crosslinking agents such as, gluteraldheyde, ethylene glycol dimethacrylate (EGDM), methylene bis-acrylamide, are used with different base hydrogel solutions to enhance the crosslinking during irradiation. Alternatively, the base hydrogel can be formed by heating in the presence of the crosslinking agent and preferably an initiator to crosslink the hydrogel molecules and cause gelation. Initiators such as AIBN, benzoyl peroxide (BPO), or ammonium persulfate can be used. Chemical crosslinking can either be initiated by radiation and/or by heating. These gelation methods can be used in any combination as well for the formation of the base hydrogels. In some embodiments the base hydrogel solution prior to gelation may also contain the hydrophilic entities that are intended to increase the equilibrium water and/or lubricity of the base hydrogel. In these embodiments additional processing steps may be necessary to crosslink the hydrophilic entity to the base hydrogel and/or to itself. Examples of these additional processing steps are dehydration followed by thermal treatment, radiation crosslinking in the presence or absence of a crosslinking agent, and/or chemical crosslinking in the presence of a crosslinking agent.

In one embodiment, aqueous poly(acryl amide) (PAAm) solution is mixed with an aqueous solution of poly(vinyl alcohol) (PVA) at an elevated temperature above room temperature to form a homogenous PVA-PAAm solution. PVA:PAAm ratio can be about 1:1, 1:2, or 1:3, with the total polymer content in the mixture at about 10 wt % to about 50% of higher, for example, about 15 wt %, 20 wt %, 25 wt %, 30 wt %, 35 wt %, 40 wt % or higher, or 45 wt %. The homogenous PVA-PAAm solution can be heated or irradiated to form a gel. The homogenous PVA-PAAm solution also can be poured into a mold (optionally pre-heated) followed by cooling down to a lower temperature to form a gel.

In another embodiment, aqueous poly(acry amide) (PAAm) solution is mixed into an aqueous solution of poly(vinyl alcohol) (PVA) at an elevated temperature above room temperature to form a homogenous PVA-PAAm solution. PVA:PAAm ratio can be about 1:1, 1:2, or 1:3, with the total polymer content in the mixture at about 10 wt % to about 50% or more, for example, about 15 wt %, 20 wt %, 25 wt %, 30 wt %, 35 wt %, 40 wt %, or 45 wt % or higher than 45%. Hot PVA-PAAm (for example, at about 90° C.) solution can be poured into a mold (optionally pre-heated) followed by freezing at a temperature below 0° C. followed by thawing above 0° C. In some embodiments the freeze thaw cycles are repeated.

According to one aspect of the invention, the mold is pre-heated to a temperature between about 1 and about 200° C., preferably between about 25° C. and about 150° C., more preferably about 90° C.

The hydrophilic entity incorporated in the PVA-PAAm gels by any of the methods described above is not limited to PAAm homopolymer, but can be other types of hydrophilic polymers with chemical functionality, namely, copolymer, PVA-PAAm copolymer, poly(ethylene oxide)(PEO)-PAAm copolymer, polyvinylpyrrolidone (PVP), hyaluronic acid (HA), and poly(allylamine hydrochloride) (PAH). The freeze-thaw methods described in the above gels do not need to be limited to 1 cycle of freeze/thaw but can be more than one cycle, for example, 2, 3, 4, 5, 8, 10 or more cycles. In any of the above embodiments the final gel device can be dehydrated in a solvent or under vacuum and/or subsequently heated prior to final re-hydration in water or physiologic saline solution.

According to one embodiment, once PVA gels containing PAAm are made using any of the above methods described herein, the gels are dehydrated in one or combination of the following environments; in air, vacuum, inert gas, or organic solvents. Dehydration of PAAm containing PVA gels can render PAAm molecules physically trapped inside the PVA gel network by densification, pore collapse, or further PVA crystallization.

According to another embodiment, once PVA gels containing PAAm are made using any of the above methods, the gels are dehydrated in one or combination of the following environments; in air, vacuum, and/or inert gas at an elevated temperature below the melting point of the gel. Dehydration of PAAm containing PVA gels can render PAAm molecules physically trapped inside the PVA gel network by densification, pore collapse, or further PVA crystallization. Another alternative dehydration method is through soaking the hydrogel in PEG or a PEG solution. The PEG solution could be in any solvent such as water, ethanol, isopropyl alcohol and other alcohols, acetone and other ketones, aldehydes, salt solutions, acid solutions and the like. The PEG solution can vary in concentration between 1 and 100% PEG in the respective solvent.

According to another embodiment, once PVA gels containing PAAm are made using any of the above methods, the gels are dehydrated in one or combination of the following environments; in air, vacuum, and/or inert gas, at an elevated temperature below the melting point of the gel. Dehydration of PAAm containing PVA gels can render PAAm molecules physically trapped inside the PVA gel network by densification, pore collapse, or further PVA crystallization. Subsequent to dehydration, the gel can be thermally treated in vacuum, or inert gas at an elevated temperature higher than 100° C., preferably above or below about 160° C., for example, above about 80° C. to about 260° C., for about an hour up to about 20 hours or longer. Such thermal treatments can improve mechanical strength of the gels by further increasing PVA crystallinity.

Thermal treatment under high pressure: Thermal treatment method described in PEG annealing above also can be done at an elevated pressure than the ambient atmosphere.

Cross-linking by anhydrides and esters: Thermal treatment methods described above can chemically cross-link PAAm chains by forming anhydrides between carboxylic acids thus making PAAm-interpenetrating network with PVA network. Hydroxyl groups in PVA and carboxylic acids in PAAm also can form esters during such thermal treatments.

Cross-linking by gamma, e-beam irradiation: In some embodiments radiation cross-linking in the PAAm containing PVA gels processed by methods described here are carried by gamma or e-beam irradiation. The cross-linking increases the wear resistance and creep resistance. The cross-linking can be carried out at any step of the processing/methods described herein.

Cross-linking by cross-linking agents: Another type of chemical cross-linking method is using cross-linking agents such as ethyleneglycol dimethacrylate (EGDMA) to cross-link PAAm chains in the PVA-PAAm gels processed by methods described above. Cross-linkers such as glutaraldehyde and epichlorohydrin can cross-link PVA chains in the gel to improve mechanical properties in addition to physical locking of the incorporated PAAm in the gel.

Cross-linking of PAAm during pH-induced volume transition: The charge density of the PAAm chains is pH-tunable which enables systematic control of the electrostatic repulsion imparted from the anionic charges. By adjusting the charge density by lowering the pH of the PAAm-containing gel well below its pKa values, one can increase the number of protonated carboxylates in PAAm, which can bring PAAm chains closer and also promote intramolecular or intermolecular hydrogen bonding in PAAm. PAAm chains at such a state are cross-linked among themselves or with neighboring PVA chains by any of the methods described above. Increasing the pH of the gel back to physiological pH value deprotonates the non-cross-linked acid groups in PAAm, whose electrostatic repulsion will benefit the mechanical integrity of the gels under repetitive loading conditions expected in the joint space.

Controlled diffusion of PAAm into the PVA cryogels for gradient distribution of PAAm in the recipient gel: The effects of incorporated PAAm into the PVA gels can be controlled to result in a non-uniform gel with a gradient of properties, i.e., larger effects from the presence of PAAm on the gel surface than the bulk of the gel by having a higher PAAm concentration on the surface than the bulk. This is achieved by controlling and/or varying the diffusion rate. Diffusion rate will be faster with lower molecular weight PAAm, with larger pores in the PVA, with increased porosity of PVA, with higher hydration of the PVA, and the like.

Layer-by-layer buildup to create "vertical" gradient properties: PVA-PAAm gels can be built up in a layer-by-layer fashion by sequentially molding different concentration solution in the mold (optionally pre-heated) to achieve gradient properties. The gradient is thus disposed in a direction perpendicular to the direction of deposit. A hot (for example, about 90° C.) PVA-PAAm mixture solution is poured into a container up to a certain thickness to form the first layer. The solution in the mold (optionally pre-heated) is gelled by cooling down to the room temperature or lower temperature. Gelation can also be achieved by radiation. Upon gelling, the first layer in the container is heated to a temperature below the melting temperature with no disruption of the formed layer. Another layer of solution is added from a hot PVA-PAAm mixture to the first layer to ensure adhesion of the two layers. The second layer can be formed from same or different composition of the polymer solution, or a new component can be added in the mixture. The container is again cooled down and/or irradiated to form a layered gel structure. This procedure can be repeated to the desired number of layers or thickness. Such layer-by-layer gel formation can be applied to PVA cryogel as well, followed by PAAm diffusion.

Gradient effects of thermal treatment: Thermal treatment on the PAAm containing PVA gels can be deliberately controlled in a gradient manner by having one of the surfaces of the dehydrated gel in contact with higher temperature than the opposite surface of the gel. The gel surface in contact with higher temperature will be affected more by heating, i.e., more cross-linking and higher crystallinity, lower water content, and the like, than the other surface in contact with lower temperature.

According to one embodiment, this invention provides fabricated PVA-PAAm-hydrogels, PVA-PAAm-hydrogel-containing compositions, and methods of making PVA-PAAm-hydrogels and PVA-PAAm-hydrogel-containing compositions. The invention also provides methods of using the fabricated PVA-PAAm-hydrogels and PVA-PAAm-hydrogel-containing compositions in treating a subject in need.

Hydrogels described in the prior art (see for example, U.S. Pat. Nos. 4,663,358, 5,981,826, and 5,705,780, US Published Application Nos. 20040092653 and 20040171740) can be used as starting materials for making PVA-hydrogels of the present invention by employing methods described herein for the first time. The PVA-PAAm-hydrogels provided in the present invention can be used in a body to augment or replace any tissue such as cartilage, muscle, breast tissue, nucleus pulposus of the intervertebral disc, other soft tissue, interpositional devices that generally serves as a cushion within a joint, and the like. These PVA-PAAm-hydrogels provided in the present invention also can be used in the spine for augmenting, replacing the nucleus pulposus, as wound dressing, or as drug delivery vehicles.

PVA-PAAm-hydrogels generally include polymer, polymer blends, or copolymers of polyvinyl alcohol (PVA), polyvinyl pyrrolidone (PVP), poly ethylene oxide (PEO), polyacrylamide (PAAm), alginates, polysaccharides, polyoxyethylene-polyoxypropylene co-polymers, poly-N-alkylacrylamides, poly-N-isopropyl acrylamide (PNIAAm), chondroitin sulfate, dextran sulfate, dermatin sulfate, or combinations of two or more thereof.

PVA-PAAm-hydrogels, as disclosed herein, comprised of uniformly distributed hydrogel molecules or hydrogel particles comprising polyvinyl alcohol (PVA) copolymerized and/or blended with at least one of the other polymers or gellants, for example, polyvinyl pyrrolidone (PVP), poly-N-isopropyl acrylamide (PNIPAAm), poly ethylene oxide (PEO), chondroitin sulfate, dextran sulfate, dermatin sulfate and the like, or combinations of two or more thereof.

According to one aspect of the invention, the PVA-PAAm-hydrogels comprise polyvinyl alcohol (PVA) copolymerized and/or blended with at least one of the other polymers.

According to another aspect of the invention, the hydrogel solutions comprise polyvinyl alcohol (PVA), polyacrylamide (PAAm), polyvinyl pyrrolidone (PVP), poly ethylene oxide (PEO), poly-N-isopropyl acrylamide (PNIAAm), or combinations of two or more thereof.

According to another aspect of the invention, the hydrogel solution is a polyvinyl alcohol-polyacrylamide (PVA-PAAm) solution.

PVA-PAAm-hydrogels of the invention can be used in a variety of fashions in joints in mammals such as human joints. For example, an interpositional device can be manufactured from the PVA-PAAm-hydrogels, which meet required mechanical strength to withstand high loads of human joints, and can be used in articular cartilage replacement applications. The interpositional devices typically act as a cushion within the joint to minimize the contact of the cartilage surfaces to each other. This is beneficial in patients with arthritic joints. Early arthritic joints with cartilage lesions can be treated with such interpositional devices, which minimizes the contact between the damaged cartilage surfaces of the patient. The interpositional devices are described by Fell et al. (see U.S. Pat. Nos. 6,923,831, 6,911,044, 6,866,684, and 6,855,165). These devices can have a variety of shapes and sizes. For a hydrogel interpositional device to perform in vivo in the long-term, the device first needs to have a high creep resistance. This is to minimize the changes to the shape of the interpositional hydrogel device during in vivo use. PVA-hydrogel materials of the invention with increased stiffness display increased creep resistance. The hydrogel interpositional device according to the invention also have superior mechanical properties, such as toughness, wear resistance, high creep resistance, and the like.

Another method for the use of a hydrogel implant is through the filling of a cavity in the joint. The cavity can be an existing one or one that is prepared by a surgeon. A PVA-PAAm-hydrogel plug can be inserted into the cavity. The hydrogel plug can be of any shape and size; for instance it can be cylindrical in shape. In some embodiments the plug can be oversized to be elevated from the surrounding cartilage surface. In other embodiments the plug can be undersized to stay recessed in the cavity. The over-sizing or under-sizing can be such that the plug can stand proud above the surrounding cartilage surface or recessed from the surrounding cartilage surface by about less than 1 mm, by about 1 mm, by more than about 1 mm, by about 2 mm, by about 3 mm, or by about more than 3 mm. In some embodiments the hydrogel plug can be slightly dehydrated to shrink its size and to allow an easy placement into the cavity. The hydrogel plug then can be hydrated and swollen in situ to cause a better fit into the cavity. The dehydrated and re-hydrated dimensions of the hydrogel plug can be tailored to obtain a good fit, under-sizing, or over-sizing of the plug after re-dehydration and re-swelling. The re-dehydration in situ can also be used to increase the friction fit between the plug and the cavity. This can be achieved by tailoring the dimensions and the extent of dehydration such that upon re-dehydration the cross-section of the plug can be larger than the cross-section of the cavity; by for instance about 1 mm, less than 1 mm, or more than 1 mm. In some embodiments the cavity can be filled with an injectable hydrogel system known in the art, such as the one described by Ruberti and Braithwaite (see US Published Application Nos. 20040092653 and 20040171740), Muratoglu et al. (International Application WO 2006/125082), Lowman (US Published Application No. 20040220296), and other injectable systems.

The present invention also provides methods of fabricating PVA-PAAm-hydrogel systems to obtain PVA-PAAm-hydrogels that can maintain shape under the high stress of human joints. According to one aspect of the invention, the PVA-PAAm-hydrogels are obtained by improving the stiffness, toughness and strength of hydrogels to increase resistance to creep and resistance to wear. The invention provides dehydration methods useful for improving the mechanical properties of the hydrogel. Various dehydration methods, described above, can be used together in combinations to improve the properties of hydrogels. Any of the dehydration methods can be used either by itself or in combination with the other dehydration methods to improve the mechanical properties of hydrogels.

In the case of extreme dehydration of the PVA-PAAm-hydrogel, it can be important for some of the applications to subsequently re-hydrate the PVA-PAAm-hydrogel at least to some extent to regain the lubrication imparted by the presence of water for some of the embodiments. If the heat dehydration is carried out starting with a hydrogel that contains water and one or more other ingredient(s), which are in most embodiments non volatile such as low molecular weight PEG, and others such as PVP, PEO, chondrotin sulfate, the dehydrated hydrogel is easily re-hydrated to varying levels. According to one aspect of the invention, the level of re-hydration following heat dehydration depends on the concentration of other ingredient(s) in the water phase of the initial hydrogel before dehydration. In contrast, if the starting hydrogel contains no other ingredients but water, then the extent of re-hydration subsequent to heat dehydration is substantially reduced compared to the re-hydration levels of the hydrogels dehydrated in the presence other ingredient(s). The presence of the other ingredient(s) other than water also has implication on the creep behavior of the hydrogel following heat dehydration and subsequent re-hydration. The hydrogel is more viscoelastic when it is heat treated in the presence of other ingredient(s).

According to another aspect, PVA-PAAm-hydrogels containing a low molecular weight ingredient, such as PEG, retain their opacity during heat dehydration. In contrast, PVA-hydrogels containing no such ingredients and heat dehydrated under identical conditions lose their opacity and turn transparent, an indication for the loss of the molecular porosity. The molecular porosity is thought to be the free space in the structure where the water molecules penetrate the hydrogel, thus hydrating it. The loss of the opacity upon heat dehydration of hydrogels not containing any such ingredient can be the reason for their substantially reduced ability to re-hydrate. According to one aspect on the invention, the non-volatile ingredient remains in the hydrogel structure during heat dehydration and prevents the collapse of the molecular porosity, and thus allowing these hydrogels to re-hydrate following heat dehydration.

The invention also provides freeze-thaw prepared PVA-PAAm (FT-PVA-PAAm) hydrogels, wherein the PVA-PAAm-hydrogel is further treated by heating at around 160° C. Upon re-hydration, the heated gels remain transparent forming an elastic and tough, almost rubber-like material. While this material is useful in some application, it may not be for applications requiring high water content in the hydrogel. The extent of re-hydration is further tailored in the heated FT-PVA-PAAm by adding an ingredient such as PEG into the water phase prior to the heating.

In another embodiment, the PVA-PAAm-hydrogel implant is packaged and sterilized. The packaging can be such that the hydrogel device is immersed in an aqueous solution to prevent dehydration until implantation, such as during sterilization and storage. The aqueous solution can be water, deionized water, saline solution, Ringer's solution, or salinated water. The aqueous solution also can be a solution of poly-ethylene glycol in water. The solution can be of less than 5% (wt) in PEG, about 5% (wt), more than about 5% (wt), about 10% (wt), about 15% (wt), about 20% (wt), about 30% (wt), about 50% (wt), about 90% (wt) or about 100% (wt). The hydrogel device also can be sterilized and stored in a non-volatile solvent or non-solvent.

The sterilization of the PVA-PAAm-hydrogel implant can be carried out through gamma sterilization, heat, gas plasma sterilization, or ethylene oxide sterilization, for example. According to one embodiment, the hydrogel is sterilized by autoclave. The sterilization is carried out at the factory; or alternatively, the implant is shipped to the hospital where it is sterilized by autoclave. Some hospitals are fitted with ethylene oxide sterilization units, which also can be used to sterilize the hydrogel implant.

In one embodiment, the hydrogel implant is sterilized after packaging. In other embodiments the hydrogel implant is sterilized and placed in a sterile aqueous solution.

In another embodiment, PVA-PAAm-hydrogel is prepared using the freeze-thaw method starting with an aqueous PVA solution (at least about 10% (wt) PVA, above about 15% (wt) PVA, about 20% (wt) PVA, about 25% (wt) or more PVA and subjecting it to freeze-thaw cycles (at least 1 cycle to 100 cycles, for example, more than 2, 3, 4, 5, 6, 7, 8, 9, 10 or more cycles). The freeze-thaw cycle is defined as cooling the PVA solution below 0° C. and heating it back up above 0° C. The PVA-PAAm-hydrogel is then subjected to dehydration. Subsequently, the dehydrated hydrogel is placed in saline solution for re-hydration. This process results in very little re-hydrated PVA-PAAm-hydrogel with high mechanical strength.

In another embodiment, the invention provides a process of modification of PVA-PAAm-hydrogels to increase water content, improve lubricity, with least compromise with mechanical strength, such as creep resistance by addition of hydrophilic ionic molecules such as PAAm by methods of blending prior to gelling and/or diffusion into the formed gel.

In another embodiment, the invention provides a process incorporation of solvents such as PEG during subsequent processing on PVA-PAAm gels to prevent loss of mechanical integrity and maintain high water affinity by methods of blending PEG during PVA-PAAm gel formation; diffusing PEG into the PVA-PAAm gels; and/or diffusing PEG simultaneously or sequentially as PAAm into the PVA gels.

In one embodiment of the invention, the PVA:PAAm ratio can be 1:1, 1:2, or 1:3, with the total polymer content in the mixture at about 10 wt % to about 50%, for example, about 15 wt %, 20 wt %, 25 wt %, 30 wt %, 35 wt %, 40 wt %, or 45 wt % or more.

In another embodiment, the invention provides a process of controlled diffusion of PAAm into the PVA gels for gradient distribution of PAAm in the recipient gel. PAAm containing PVA gels can be dehydrated in air, vacuum, inert gas, solvents for physical fixation of PAAm in the PVA gel at room temperature, or at an elevated temperature, such as below or above 80° C., for example above room temperature to about 100° C. Thermal treatment following dehydration on PAAm containing PVA gels can be done in vacuum, inert gas at temperature higher than 100° C., preferably above or below 160° C., for example, above about 80° C. to about 260° C., for 1 hour up to 24 hours or longer for irreversibly linking PAAm in the hydrogel network and improve creep resistance. Thermal annealing following dehydration on PAAm containing PVA gels in vacuum, inert gas also can be done by heating at heating rates such as about 0.01° C./min, about 0.1° C./min, about 1° C./min, or about 10° C./min, starting at room temperature or at an elevated temperature, such as below or above 80° C., for example above room temperature to about 100° C., up to a final temperature higher than about 100° C., preferably above or below 160° C., for example, above about 80° C. to about 260° C., for about one hour up to 24 hours or longer.

According to another aspect of the invention, above described processes also can be carried under high pressure environment. The thermal treatment method described herein also can be carried out at an elevated pressure than the ambient atmosphere.

According to another aspect of the invention, cross-linking of PAAm in PVA gels with or without PEG can be done by gamma or e-beam irradiation. Cross-linking of PAAm in PVA gels with or without PEG can be done by chemical cross-liking method using cross-linking agents such as ethyleneglycol dimethacrylate (EGDMA). Cross-linking density of PAAm in PVA gels can be controlled through pH-adjustment prior to cross-linking by altering the number of protonated carboxylates in PAAm chains.

According to another aspect of the invention, "vertical" gradient properties of the final gel can be formed by composition control, for example, a) Layer-by-layer buildup of PVA-PAAm gels with varying composition ratio of PVA to PAAm in each layer by adding one layer at a time in repeated freeze-thawing process; b) Layer-by-layer buildup of PVA-PAAm gels with varying composition ratio of PVA to PAAm in each layer by adding one layer at a time in repeated freeze-thawing process or theta-gelling process; and c) co-extrusion to form layers of PVA/PAAm of different concentrations.

According to another aspect of the invention, the "vertical" gradient properties of the final gel can be also formed by heating condition control by a) having one of the surfaces of the dehydrated gel in contact with higher temperature than the opposite surface of the gel; and b) having only one of the surfaces of the non-PEG containing dehydrated gel in contact with PEG during heating.

In one embodiment of the invention, PEG is used as a non-volatile non-solvent for PVA hydrogels. DMSO is used instead of water in preparing the aqueous PVA-PAAm-solution, the precursor to the hydrogel.

In one embodiment of the invention, PEG solution is a solution of PEG in a solvent (preferably water, ethanol, ethylene glycol, DMSO, or others). The solution concentration can be anywhere between 0.1% (wt) PEG and 99.9% (wt) PEG. The PEG in the solution can be of different molecular weights (preferably 300, 400, or 500 g/mol, more than 300 g/mol, 1000 g/mol, 5000 g/mol or higher). The PEG in the solution can be a blend of different average molecular weight PEGs.

In another embodiment, PEG containing PVA-PAAm-hydrogel is prepared using the freeze-thaw method starting with an aqueous PVA solution (at least about 1% (wt) PVA to about 99 (wt %) PVA, for example, about 15% (wt) PVA, about 20% (wt) PVA, about 25% (wt) PVA, about 27% (wt) PVA, about 30% (wt) PVA, about 35% (wt) PVA, about 40% (wt) PVA, or about 45% (wt) PVA and subjecting it to freeze-thaw cycles (at least 1 cycle to 100 cycles, for example, 2, 3, 4, 5, 6, 7, 8, 9, 10 or more cycles). At this step the PVA-PAAm-hydrogel can be optionally placed in saline to reach full hydration. Subsequently, the gel is placed in a low molecular weight PEG solution. This is to dope the hydrogel with the non-solvent PEG. The duration of PEG solution soak can be varied to either reach a uniform equilibrium PEG content throughout the hydrogel or to reach a non-uniform PEG distribution (by shortening the soak duration). The latter results in PEG-rich skin and a gradient of PEG concentration within the PVA-PAAm-hydro gel.

In another embodiment, PEG containing PVA hydrogel is prepared by starting with an aqueous PVA solution (at least about 1% (wt) PVA to above about 99% (wt) PVA, for example, above about 15% (wt) PVA, about 20% (wt) PVA, about 25% (wt) PVA, about 27% (wt) PVA, about 30% (wt) PVA, about 35% (wt) PVA, about 40% (wt) PVA, or about 45% (wt) PVA) and mixing it with a low molecular weight PEG solution at an elevated temperature (above room temperature or above 50° C.). Upon cooling down to room temperature, the mixture forms a PVA-PAAm-hydrogel containing water and the non-solvent PEG.

In another embodiment, PVA-PAAm-hydrogel is heat dehydrated. The PVA-PAAm-hydrogel contains PEG during heat dehydration (or heating). The heating can be carried out a temperature about 40° C. to about 200° C. or more. The heat dehydration is carried out at about 40° C., at above about 40° C., at 80° C., at above 80° C., at 90° C., at about 100° C., at above 100° C., at about 150° C., at about 160° C., at above 160° C., at about 180° C., at above 180° C., at about 190° C., at above 190° C., at about 200° C., or at above 200° C. In another embodiment, the dehydration is carried out at about 40° C., about 80° C., about 90° C., about 100° C., about 150° C., about 160° C., about 180° C., about 190° C., about 200° C., or above 200° C. for about an hour to about 24 hours. The duration and the temperature of the thermal treatment depends on the size and hydration level of the hydrogel, for example, the duration can be for about an hour or less, about 5 hours, about 10 hours, about 24 hours, several days, or a few weeks. The heat dehydration can be carried out in any environment, preferably in an inert gas like nitrogen or argon or in vacuum. The heat dehydration also can be carried out in air or acetylene gas or mixture of a number of gases. The heat dehydration can be carried out either by placing the hydrogel in an already heated environment to achieve a higher rate of heat dehydration or by heating the hydrogel slowly to achieve a slower rate of heat dehydration. According to another embodiment, prior to heat dehydration, the PVA-PAAm-hydrogel can be preheated at a temperature below the melting point of the hydrogel. The rate of heat dehydration can be such that the hydrogel loses weight from removal of water at a rate of 1% weight loss per day, 10% weight loss per day, 50% weight loss per day, 1% weight loss per hour, 10% weight loss per hour, 50% weight loss per hour, 1% weight loss per minute, 5% weight loss per minute, 10% weight loss per minute, 50% weight loss per minute or any amount thereabout or therebetween. The rate of heat dehydration depends on the rate at which the temperature is raised and the size of the hydrogel. Prior to heat dehydration, the hydration level of the hydrogel can be reduced by vacuum dehydration. Subsequent to the heat dehydration the hydrogel is placed in saline solution for re-hydration. This results in good levels of re-hydration in the PVA hydrogel resulting in high mechanical strength and good lubrication when articulating against human cartilage or other hydrophilic surfaces. This hydrogel is expected to maintain its hydrogen bonded structure, thus is not be subject to dissolution over long-term in water, saline or bodily fluid.

Although the description and examples are given for a PVA-PAAm-hydrogel systems, but can be applied to any hydrogel system of a polymeric structure, that is, with long-chain molecules. Therefore, the invention provides hydrogel systems that includes, but not limited to, PVA and/or PAAm as the base material.

According to one aspect of the invention, PVA or PAAm can be used as the base hydrogel. The base PVA or PAAm hydrogel can be prepared by the well-known freeze-thaw method by subjecting a PVA or PAAm solution (PVA or PAAm can be dissolved in solvents such as water or DMSO) to one or multiple cycles of freeze-thaw. PVA or PAAm solution used in the freeze-thaw method can contain another ingredient like PEG. The base PVA- or PAAm-hydrogel also can be prepared by radiation cross-linking of a PVA or PAAm solution. Another method of preparing the PVA or PAAm hydrogel can be used to blend a PVA or PAAm solution with a gallant (for example, PEG) at an elevated temperature and cooling down to room temperature.

In one embodiment, the hydrogel can be of any shape, such a cubical shape, cylindrical shape, rectangular prism shape, or implant shape.

In another embodiment, NIPAAM can be used as the base hydrogel. The base NIPAAM hydrogel can be prepared by radiation cross-linking of a NIPAAM solution. Alternatively, the methods described by Lowman et al. can be used.

In another embodiment, a double network (DN) hydrogel structure can be used as the base hydrogel. The base DN hydrogel can be prepared by methods described by Gong et al. (see *Advanced Materials*, 2003, 15, No. 14: 1155-1158). The first network can be formed by reacting hydrophilic monomers such as 2-acrylamindo-2-methylpropanesulfonic acid (AMPS) in presence of cross-linking agents. The gel is then immersed in the aqueous solution containing another type of monomer such as acrylamide (AAm). Subsequent synthesis of the second network from those newly introduced monomers produces the DN hydrogel can be used as the base hydrogel.

In another embodiment, a topological gel (TP) can be used as the base hydrogel. The base TP hydrogel can be prepared by methods described by Tanaka et al. (see *Progress in Polymer Science,* 2005, 30: 1-9). The polymer chains in TP gels are flexibly bound by cross-linkers that are sliding along the individual chain.

In the following embodiments, a nanocomposite (NC) gel structure can be used as the base hydrogel. The base NC hydrogel can be prepared by methods described by Tanaka et al. (see *Prog. Polym. Sci.* 2005, 30: 1-9).

In some of the embodiments a dehydrated hydrogel can be used as the base hydrogel. The level of dehydration can be controlled such that the base hydrogel contains between 99% and 1% water, more preferably between 99% and 5% water, more preferably between 99% and 25% water, more preferably between 99% and 50% water, more preferably between 99% and 75% hydrogel, more preferably about 70% (wt) water, or 80% (wt) water.

The water content of the hydrogel can be determined by measuring the weight change of between its equilibrium hydration level and its dehydrated level.

In some embodiments, a hot solution of PVA-PAAm-PEG in water is cooled down to room temperature and is used in its "as-gelled" form.

According to one aspect of the invention, the PVA-PAAm-PEG-hydrogel is immersed in water, deionized water, saline solution, phosphate buffered saline solution, Ringer's solution or salinated water to remove the PEG. The process is called the dePEGing process. During dePEGing the hydrogel also absorbs water approaching equilibrium water content. Therefore, dePEGing also can be a re-hydration process.

In another embodiment, the dehydrated hydrogel is re-hydrated. In some of the embodiments, the re-hydrated hydrogel contains less water than the hydrogel did before the dehydration step.

In some embodiments, the hydrogel dimensions are large enough so as to allow the machining of a medical device.

Dehydration of the hydrogel can be achieved by a variety of methods. For instance, the hydrogel can be placed in vacuum at room temperature or at elevated temperatures to drive out the water and cause dehydration. The amount of vacuum can be reduced by adding air or inert gas to the vacuum chamber where the hydrogel is placed during dehydration. Dehydration of the hydrogel also can be achieved by keeping it in air or inert gas at room temperature or at an elevated temperature. Dehydration in air or inert gas also can be carried out at temperatures lower than room temperature. In many embodiments, if the dehydration is carried out at elevated temperatures, it is necessary to keep the temperature below the melting point of the hydrogel. However, the melting point of the hydrogel can increase during the dehydration step and make it possible to go to higher temperatures as the dehydration evolves. Dehydration of the hydrogel also can be carried out by placing the hydrogel in a solvent. In this case the solvent drives the water out of the hydrogel. For example, placing of PVA-PAAm-hydrogel in a low molecular weight PEG (higher than 100 g/mol, about 300-400 g/mol, about 500 g/mol) can cause dehydration of the PVA-PAAm-hydrogel. In this case the PEG can be used as pure or in a solution. The higher the PEG concentration the higher the extent of dehydration. The solvent dehydration also can be carried out at elevated temperatures. These dehydration methods can be used in combination with each other.

Re-hydration of the hydrogel can be done in water containing solutions such as, saline, water, deionized water, salinated water, or an aqueous solution or DMSO.

In some embodiments when the acrylamide monomer is used to polymerize the IPN hydrogel, the unreacted monomer will have to be removed. One method is to wash the hydrogel with water at room temperature or at an elevated temperature. The unreacted monomer extraction can also be carried out by contacting the hydrogel with a supercritical fluid, such as $CO_2$ or propane. Another alternative is to crosslink the hydrogels (radiation crosslinking or chemical crosslinking with epichlorohydrin, gluteraldehyde, methylene bisacrylamide, N-(1-Hydroxy-2,2-dimethoxyethyl) acrylamide, ethylene glycol dimethacrylate (EGDMA or EGMA) and derivatives (such as diethylene glycol dimethacrylate, triethylene glycol dimethacrylate, and the like), ethylene glycol diacrylate (EGDA) and derivatives such as diethylene glycol diacrylate, tetra ethylene glycol diacrylate, N,N.-(1,2-Dihydroxyethylene) bisacrylamide, divinylbenzene, and/or the like) and wash it with water or soak it in a supercritical fluid below or above the melting point of the hydrogel.

In some embodiments, the hydrogel is shaped into a medical device and subsequently dehydrated. The dehydrated implant is then re-hydrated. The initial size and shape of the medical implant is tailored such that the shrinkage caused by the dehydration and the swelling caused by the subsequent re-hydration (in most embodiments the dehydration shrinkage is larger than the re-hydration swelling) result in the desired implant size and shape that can be used in a human joint.

In certain embodiments, the PVA-PAAm-hydrogel can be machined into a desired shape to act as medical device, such as a kidney shaped interpositional device for the knee, a cup shaped interpositional device for the hip, a glenoid shaped interpositional device for the shoulder, other shapes for interpositional devices for any human joint. Also the machining of the PVA-PAAm-hydrogel can result in a cylindrical, cuboid, or other shapes to fill cartilage defects either present in the joint or prepared by the surgeon during the operation.

The PVA-PAAm-hydrogel medical device can be an interpositional device such as a unispacer, to act as a free floating articular implant in a human joint, such as the knee joint, the hip joint, the shoulder joint, the elbow joint, and the upper and lower extremity joints.

In some of the embodiments, the PVA-PAAm-hydrogel is placed in 100% PEG to dehydrate the hydrogel. Subsequently the dehydrated gel is placed in saline solution for re-hydration. This process decreases the equilibrium water content in the gel, and hence further improves the mechanical properties of the hydrogel.

In other embodiments, the PVA-PAAm-hydrogel is placed in a PEG-water solution for controlled dehydration followed by re-hydration in saline. The concentration of the PEG-water solution can be tailored to achieve desired level of dehydration of the hydrogel. Higher dehydrations provide more improvements in mechanical properties and at lower dehydrations the improvement is less. In some applications, it is desirable to achieve a lower stiffness; therefore a lower PEG and/or water concentration solution can be used for the dehydration process.

In some embodiments the PVA-PAAm-hydrogel is dehydrated in vacuum at room temperature or at an elevated temperature. The vacuum dehydration can be carried out at about 10° C., above about 10° C., about 20° C., about 30° C., 40° C., 50° C., 60° C., 75° C., 80° C., 90° C., about 100° C. or above 100° C., or at 130° C. or any temperature thereabout or therebetween.

In some embodiments the vacuum dehydration of the PVA-PAAm-hydrogel is first carried out at room temperature until a desired level of dehydration is reached; thereafter the temperature is increased to further dehydrate the hydrogel. The temperature is increased, preferably to above about 100° C., to above or below 160° C., for example, above about 80° C. to about 260° C.

In some embodiments, the PVA-PAAm-hydrogel is heated in air or inert gas or partial vacuum of inert gas for dehydration.

In some of these embodiments, the PVA-PAAm-hydrogel is vacuum dehydrated before heating in air or inert gas.

In some embodiments, the heating of the PVA-PAAm-hydrogel is carried out slowly; for example at less than about 1° C./min, at more than about 1° C./min, at 2, 5, 10° C./min or faster. Slower heating rates results in stronger gels than higher heating rates with some of the PVA-PAAm-hydrogel formulations.

In most embodiments the finished medical device is packaged and sterilized.

In some of the embodiments the hydrogel is subjected to dehydration steps. The dehydration is carried out in air or in vacuum or at an elevated temperature (for instance heating at above or below 160° C., for example, above about 80° C. to about 260° C.). The dehydration causes loss of water hence a reduction in volume accompanied by a reduction in weight. The weight loss is due to loss of water. The reduction in volume on the other hand could be due to the loss of water or further crystallization of the hydrogel. In some embodiments the dehydration is carried out by placing the hydrogel in a low molecular weight polymer (for instance placing a PVA-PAAm-hydrogel in a PEG solution). In some cases the dehydration is caused by loss of water, but in most cases, there is also uptake of the non-solvent by the hydrogel. Therefore, the weight change of the hydrogel is the sum of loss of water and uptake of the non-solvent. The change in volume in this case is due to loss of water, uptake of the non-solvent, further crystallization of the hydrogel, or partial collapse of the porous structure of the non-solvent that is not occupying the space that water was filling in the pores.

In some of the embodiments, the hydrogel is attached to a metal piece. The metal piece is a porous backside surface that is used for bone-in-growth in the body to fix the hydrogel implant in place. The metal piece attachment to the hydrogel can be achieved by having a porous surface on the substrate where it makes contact with the hydrogel; the porous surface can be infiltrated by the gelling hydrogel solution (for instance a hot PVA-PAAm and/or PEG mixture in water); when the solution forms a hydrogel, the hydrogel can be interconnected with the metal piece by filling the porous space.

In some embodiments, there can be more than one metal piece attached to the hydrogel for fixation with the hydrogel in the body to multiple locations.

In some embodiments, the hydrogel/metal piece construct can be used during the processing steps described above, such as solvent dehydration, non-solvent dehydration, irradiation, packaging, sterilization, and the like.

In some of the embodiments the hydrogel contains hyaluronic acid (HA), either by having HA present in the solutions used to make the hydrogel and/or by diffusing HA into the hydrogel. In some of the embodiments the HAcontaining hydrogel is irradiated. The irradiation can be carried out before, after, or during the processing steps such as vacuum dehydration, non-solvent dehydration, re-hydration, and/or heating. The irradiation cross-links the hydrogel matrix and in some embodiments also forms covalent bonds with the HA. Addition HA to some of the hydrogels increases the lubricity of the hydrogel implant. It can be beneficial for the PVA-PAAm-hydrogels to contain substantially reduced water content.

In some embodiments, the hydrated hydrogel implants are slightly heated at the surface to partially melt the hydrogel and allow it to reform with more uptake and lubricity.

In some embodiments, a microwave oven can be used to prepare the PVA solution. The PVA powder is place in water and the mixture is heated in a microwave oven to form a solution.

In some of the embodiments the heat dehydration or heating of the hydrogel is carried out in a microwave oven.

According to one embodiment of the invention, creep resistant, lubricious and tough PVA-PAAm-hydrogel is prepared by a process comprising the steps of: a) contacting an aqueous solution of poly(vinyl alcohol) (PVA) with an aqueous solution of acrylamide monomer (AAm) solution in presence of an initiator, thereby forming a PVA-AAm solution; b) heating or irradiating the PVA-AAm solution, thereby forming an inter-penetrating network (IPN) structure of polymerized PAAm in the PVA solution; c) subjecting the PVA-PAAm IPN to at least one or more freeze-thaw cycles, thereby forming a tough PVA-PAAm hydrogel; d) dehydrating the tough PVA-PAAm hydrogel in a vacuum, thereby increasing the melting point of the PVA-PAAm hydrogel; e) annealing the dehydrated PVA-PAAm hydrogel at a temperature below the melting point of the dehydrated PVA-PAAm hydrogel; and f) re-hydrating the PVA-PAAm hydrogel, thereby forming a creep resistant, lubricious and tough PVA-PAAm-hydrogel.

According to another embodiment of the invention, creep resistant, lubricious and tough PVA-PAAm-hydrogel is prepared by a process comprising the steps of: a) contacting an aqueous solution of poly(vinyl alcohol) (PVA) with an aqueous solution of poly(acrylamide) (PAAm), thereby forming a homogenous PVA-PAAm solution; b) subjecting the PVA-PAAm solution to at least one or more freeze-thaw cycles, thereby forming a tough PVA-PAAm hydrogel; c) dehydrating the tough PVA-PAAm hydrogel at room temperature in a vacuum, thereby increasing the melting point of the PVA-PAAm hydrogel; d) annealing the dehydrated PVA-PAAm hydrogel at a temperature below the melting point of the dehydrated PVA-PAAm hydrogel; and e) re-hydrating the PVA-PAAm hydrogel, thereby forming a creep resistant, lubricious and tough PVA-PAAm-hydrogel.

According to another embodiment of the invention, creep resistant, lubricious and tough PVA-PAAm-hydrogel is prepared by a process comprising the steps of: a) contacting an aqueous solution of poly(vinyl alcohol) (PVA) with an aqueous solution of poly(acrylamide) (PAAm), thereby forming a homogenous PVA-PAAm solution; b) pouring the PVA-PAAm solution onto a mold (optionally pre-heated); c) cooling the PVA-PAAm-hydrogel by freezing at a temperature below 0° C.; d) thawing the PVA-PAAm-hydrogel to a temperature above 0° C.; e) dehydrating PVA-PAAm-hydrogel at room temperature in a vacuum; f) annealing the dehydrated PVA-PAAm hydrogel at a temperature below the melting point of the dehydrated PVA-PAAm hydrogel; and g) re-hydrating the PVA-PAAm hydrogel, thereby forming a creep resistant, lubricious and tough PVA-PAAm-hydrogel.

According to one embodiment, the mold is pre-heated to a temperature between about 1 and about 200° C., preferably between about 25° C. and about 150° C., more preferably about 90° C.

According to one embodiment, the PVA-AAm solution is heated at a temperature below the boiling point of the PVA-AAm solution, thereby forming an inter-penetrating network (IPN) structure of polymerized PAAm in the PVA solution.

According to another embodiment, the PVA-AAm solution is heated at a temperature between about 40° C. and 45° C., thereby forming an inter-penetrating network (IPN) structure of polymerized PAAm in the PVA solution.

According to another embodiment, the PVA-AAm solution is irradiated, thereby forming an inter-penetrating network (IPN) structure of polymerized PAAm in the PVA solution.

According to another embodiment, the PVA-PAAm hydrogel is dehydrated under an inert environment or in a dehydrating solvent.

According to another embodiment, the PVA-PAAm hydrogel is dehydrated by immersing in a PEG solution to allow diffusion of the PEG into the PVA-PAAm-hydrogel.

According to another embodiment, the dehydrated PVA-PAAm hydrogel is annealed at a temperature about 80° C., about 90° C., about 100° C., about 120° C., about 140° C., about 160° C., 190° C., or about 200° C., for about one hour to about 24 hours.

According to another embodiment, the dehydrated PVA-PAAm hydrogel is annealed for about 24 hours.

According to another embodiment, the PVA-PAAm hydrogel is re-hydrated by soaking in a saline solution or in water.

According to another embodiment, the PVA:PAAm ratio is about 1:1, 1:2 or 1:3.

According to another embodiment, the total polymer content in PVA-PAAm solution is about 10 wt % to about 50 wt %, for example, about 15 wt %, 20 wt %, 25 wt %, 30 wt %, 35 wt %, 40 wt % or 45 wt %.

According to another embodiment, the PVA-PAAm solution is heated to a temperature above room temperature to about 90° C.

According to another embodiment, the PVA-PAAm solution is heated to a temperature above room temperature to about 90° C.

According to another embodiment, the freeze-thaw step is repeated for at least 2, 3, 4, 5, 6, 7, 8, 9, 10, or more cycles.

According to another embodiment, the PVA-PAAm hydrogel is dehydrated to remove part or all of the water content.

According to another embodiment, the PVA-PAAm hydrogel is dehydrated by a method comprising the steps of: a) contacting the PVA-PAAm hydrogel with an organic solvent, wherein the PVA-PAAm hydrogel comprises a polymer which is not soluble in the solvent, and wherein the solvent is at least partially miscible in water; b) heating the PVA-PAAm hydrogel to a temperature below or above the melting point of the PVA-PAAm hydrogel; and c) cooling the heated PVA-PAAm hydrogel to room temperature.

According to another embodiment, the PVA-PAAm hydrogel is dehydrated by a method comprising the steps of: a) contacting the PVA-PAAm hydrogel with an organic solvent, wherein the hydrogel comprises a polymer which is not soluble in the solvent, and wherein the solvent is at least partially miscible in water; and b) air-drying the PVA-PAAm hydrogel at room temperature.

According to another embodiment, the PVA-PAAm hydrogel is dehydrated by a method comprising the steps of: a) contacting the PVA-PAAm hydrogel with an organic solvent, wherein the PVA-PAAm hydrogel comprises a polymer which is not soluble in the solvent, and wherein the solvent is at least partially miscible in water; and b) subjecting the PVA-PAAm hydrogel to at least one freeze-thaw cycle and allowing the PVA-PAAm hydrogel to warm-up room temperature.

According to another embodiment, the dehydration is carried out by placing the PVA-PAAm hydrogel in: a) a non-solvent, wherein i) the non-solvent is PEG, alcohols, acetones, saturated salinated water, vitamin, or carboxylic acid, aqueous solution of a salt of an alkali metal, and ii) the non-solvent contains more than one ingredient including water, PEG, vitamin, polymer, ester, proteoglycan, and carboxylic acid; or b) in a supercritical fluid.

According to another embodiment, the dehydration is carried out by heating the PVA-PAAm hydrogel in air or in inert gas to an elevated temperature, wherein the heating rate is slow or fast, ranging from about 0.01° C./min to about 10° C./min, or the heating follows the vacuum or air dehydration.

According to another embodiment, the dehydrated PVA-PAAm hydrogel is re-hydrated by placing the dehydrated PVA-PAAm hydrogel: i) in water, saline solution, Ringer's solution, salinated water, buffer solution, and the like, ii) in a humid chamber, or iii) at room temperature or at an elevated temperature.

According to another embodiment, the method further comprising a step of heating the PVA-PAAm to a temperature above about 40° C. to about 200° C. or more.

According to another embodiment, the PVA-PAAm hydrogel is re-hydrated to reach equilibrium.

According to another embodiment, the PVA-PAAm hydrogel is re-hydrated in water or a salt solution.

In one aspect, the invention provides a PVA-PAAm-hydrogel made by any of the methods described herein.

According to one aspect of the invention, the PVA-PAAm-hydrogel made by any of the methods described herein, the PVA-PAAm ratio is about 1:1, 1:2, or 1:3.

According to another aspect of the invention, the PVA-PAAm-hydrogel made by any of the methods described herein, the total polymer content in PVA-PAAm solution is about 10 wt % to about 50%, for example, 15 wt %, 20 wt %, 25 wt %, 30 wt %, 35 wt %, 40 wt %, or 45 wt %.

According to another aspect of the invention, the PVA-PAAm-hydrogel made by any of the methods described herein, the PVA-PAAm-hydrogel comprises one or more hydrophilic polymers selected from the group consisting of: PVA-poly(acrylamide) copolymer, poly(ethylene oxide) (PEO)-PAAm copolymer, polyvinylpyrrolidone (PVP), hyaluronic acid (HA), and poly(allylamine hydrochloride) (PAH).

According to another aspect of the invention, the PVA-PAAm-hydrogel made by any of the methods described herein, the PVA-PAAm hydrogel comprises water and/or one or more other ingredients, wherein the ingredient is PVA, PAAm, PEG, and/or salt, proteoglycan, water soluble polymer, amino acid, alcohol, DMSO, water soluble vitamin, wherein in the ingredients is partially or completely soluble in water, wherein the ingredient is PEG, wherein the PEG is in a solution of water, ethanol, ethylene glycol, DMSO, or a suitable solvent, wherein the ingredient is non-volatile, wherein the ingredient is at least partially miscible in water, wherein the ingredient is selected from the group consisting of PEG, salt, NaCl, KCl, CaCl$_2$, vitamins, carboxylic acids, hydrocarbons, esters, and amino acids, wherein the ingredient is PEG of different molecular weights or a blend of PEGs of different molecular weights, wherein the ingredient is a water miscible polymer, wherein the water miscible polymer is PEO, Pluronic, amino acids, proteoglycans, polyacrylamide, polyvinylpyrrolidone. polysaccharides, dermatin sulfate, keratin sulfate, chondroitin sulfate, or dextran suflate.

Embodiments and aspects of the invention also include:

1. PVA-PAAm-hydrogels that are capable of re-hydration following dehydration, wherein the PVA-PAAm-hydrogel is capable of re-hydration following dehydration, wherein a) the dehydration reduces the weight of the hydrogel, for example, by more than about 34%; and b) the re-hydration results increase in equilibrium water content in the re-hydrated hydrogel, for example, at least about 46%.

2. PVA-PAAm-hydrogels with biaxial orientation.

3. PVA-PAAm-hydrogels with uniaxial orientation.

4. PVA-PAAm-hydrogels with a high ultimate tensile strength.

5. Dehydration of a PVA-PAAm-hydrogel containing water and/or one or more other ingredient (for example, PEG or Salt), wherein
   a. the ingredient is non-volatile such as PEG;
   b. the ingredient is at least partially miscible with water;
   c. at least 0.1% of the hydrogel's weight constitutes one or more non-volatile ingredient, such as PEG, hydrocarbons, and the like;
   d. the ingredient is a water miscible polymer such as PEO, Pluronic, amino acids, proteoglycans, polyvinylpyrrolidone, polyacrylamide, polysaccharides, dermatin sulfate, keratin sulfate, chondroitin sulfate, dextran suflate, and the like;
   e. the ingredient is selected from the group of PEG, salt, NaCl, KCl, CaCl$_2$, vitamins, carboxylic acids, hydrocarbons, esters, amino acids, and the like;
   f. the ingredient is PEG, wherein
      i. PEG of different molecular weights, or
      ii. blends of PEGs,
   g. the dehydration is carried out by placing in a non-solvent, wherein
      i. the non-solvent is selected from PEG, alcohols (such as isopropyl alcohol), acetones, saturated salinated water, aqueous solution of a salt of an alkali metal, vitamins, carboxylic acids, and the like, or
      ii. the non-solvent contains more than one ingredient such as water, PEG, vitamins, polymers, proteoglycans, carboxylic acids, esters, and the like.
   h. the dehydration is carried out by leaving the hydrogel in air;
   i. the dehydration is carried out by placing the hydrogel in vacuum;
   j. the dehydration is carried out by placing the hydrogel in vacuum at room temperature;
   k. the dehydration is carried out by placing the hydrogel in vacuum at an elevated temperature;
   l. the dehydration is carried out by heating the hydrogel in air or inert gas to elevated temperature, wherein
      i. the heating rate is slow,
      ii. the heating rate is fast, or
      iii. the heating follows the vacuum or air dehydration; and
   m. the dehydrated hydrogel is re-hydrated
      i. by placing in water, saline solution, Ringer's solution, salinated water, buffer solution, and the like,
      ii. by placing in a relative humidity chamber, or iii. by placing at room temperature or at an elevated temperature.

Each composition and attendant aspects, and each method and attendant aspects, which are described above can be combined with another in a manner consistent with the teachings contained herein. According to the embodiments of the inventions, all methods and the steps in each method can be applied in any order and repeated as many times in a manner consistent with the teachings contained herein.

Definitions

The term "heating" refers to thermal treatment of the polymer at or to a desired heating temperature. In one aspect, heating can be carried out at a rate of about 10° C. per minute to the desired heating temperature. In another aspect, the heating can be carried out at the desired heating temperature for desired period of time. In other words, heated polymers can be annealed or continued to heat at the desired temperature for a desired period of time. Heating time at or to a desired heating temperature can be at least 1 minute to 48 hours to several weeks long. In one aspect the heating time is about 1 hour to about 24 hours. Heating temperature refers to the thermal condition for heating in accordance with the invention.

At any step of fabrication, the hydrogel can be irradiated by e-beam or gamma to cross-link. The irradiation can be carried out in air, in inert gas, in sensitizing gas, or in a fluid medium such as water, saline solution, polyethylene-glycol solution, and the like. The radiation dose level is between one kGy and 10,000 kGy, preferably 25 kGy, 40 kGy, 50 kGy, 200 kGy, 250 kGy, or above.

The terms "about" or "approximately" in the context of numerical values and ranges refers to values or ranges that approximate or are close to the recited values or ranges such that the invention can perform as intended, such as having a desired degree of cross-linking, creep resistance, lubricity and/or toughness, as is apparent to the skilled person from the teachings contained herein. This is due, at least in part, to the varying properties of polymer compositions. Thus these terms encompass values beyond those resulting from systematic error. These terms make explicit what is implicit.

"Irradiation", in one aspect of the invention, the type of radiation, preferably ionizing, is used. According to another aspect of the invention, a dose of ionizing radiation ranging from about 25 kGy to about 1000 kGy is used. The radiation dose can be about 25 kGy, about 50 kGy, about 65 kGy, about 75 kGy, about 100 kGy, about 150, kGy, about 200 kGy, about 300 kGy, about 400 kGy, about 500 kGy, about 600 kGy, about 700 kGy, about 800 kGy, about 900 kGy, or about 1000 kGy, or above 1000 kGy, or any value thereabout or therebetween. Preferably, the radiation dose can be between about 25 kGy and about 150 kGy or between about 50 kGy and about 100 kGy. These types of radiation, including gamma and/or electron beam, kills or inactivates bacteria, viruses, or other microbial agents potentially contaminating medical implants, including the interfaces, thereby achieving product sterility. The irradiation, which may be electron or gamma irradiation, in accordance with the present invention can be carried out in air atmosphere containing oxygen, wherein the oxygen concentration in the atmosphere is at least 1%, 2%, 4%, or up to about 22%, or any value thereabout or therebetween. In another aspect, the irradiation can be carried out in an inert atmosphere, wherein the atmosphere contains gas selected from the group consisting of nitrogen, argon, helium, neon, or the like, or a combination thereof. The irradiation also can be carried out in a sensitizing gas such as acetylene or mixture or a sensitizing gas with an inert gas or inert gases. The irradiation also can be carried out in a vacuum. The irradiation can also be carried out at room temperature, or at between room temperature and the melting point of the polymeric material, or at above the melting point of the polymeric material. Subsequent to the irradiation step the hydrogel can be melted or heated to a temperature below its melting point for annealing. These post-irradiation thermal treatments can be carried out in air, PEG, solvents, non-solvents, inert gas and/or in vacuum. Also the irradiation can be carried out in small increments of radiation dose and in some embodiments these sequences of incremental irradiation can be interrupted with a thermal treatment. The sequential irradiation can be carried out with about 1, 10, 20, 30, 40, 50, 100 kGy, or higher radiation dose increments. Between each or some of the increments the hydrogel can be thermally treated by melting and/or annealing steps. The thermal treatment after irradiation is mostly to reduce or to eliminate the residual free radicals in the hydrogels created by irradiation, and/or eliminate the crystalline matter, and/or help in the removal of any extractables that may be present in the hydrogel.

In accordance with another aspect of this invention, the irradiation may be carried out in a sensitizing atmosphere. This may comprise a gaseous substance which is of sufficiently small molecular size to diffuse into the polymer and which, on irradiation, acts as a polyfunctional grafting moiety. Examples include substituted or unsubstituted polyunsaturated hydrocarbons; for example, acetylenic hydrocarbons such as acetylene; conjugated or unconjugated olefinic hydrocarbons such as butadiene and (meth)acrylate monomers; sulphur monochloride, with chloro-tri-fluoroethylene (CTFE) or acetylene being particularly preferred. By "gaseous" is meant herein that the sensitizing atmosphere is in the gas phase, either above or below its critical temperature, at the irradiation temperature.

"Supercritical fluid" refers to what is known in the art, for example, supercritical propane, acetylene, carbon dioxide ($CO_2$). In this connection the critical temperature is that temperature above which a gas cannot be liquefied by pressure alone. The pressure under which a substance may exist as a gas in equilibrium with the liquid at the critical temperature is the critical pressure. Supercritical fluid condition generally means that the fluid is subjected to such a temperature and such a pressure that a supercritical fluid and thereby a supercritical fluid mixture is obtained, the temperature being above the supercritical temperature, which for $CO_2$ is 31.3° C., and the pressure being above the supercritical pressure, which for $CO_2$ is 73.8 bar.

"Metal Piece", in accordance with the invention, the piece forming an interface with polymeric material is, for example, a metal. The metal piece in functional relation with polymeric material, according to the present invention, can be made of a cobalt chrome alloy, stainless steel, titanium, titanium alloy or nickel cobalt alloy, for example.

"Non-metallic Piece", in accordance with the invention, the piece forming an interface with polymeric material is, for example, a non-metal. The non-metal piece in functional relation with polymeric material, according to the present invention, can be made of ceramic material, for example.

The term "inert atmosphere" or "inert environment" refers to an environment having no more than 1% oxygen and more preferably, an oxidant-free condition that allows free radicals in polymeric materials to form cross links without oxidation during a process of sterilization. An inert atmosphere is used to avoid $O_2$, which would otherwise oxidize the medical device. Inert atmospheric conditions such as nitrogen, argon, helium, or neon are used for sterilizing polymeric medical implants by ionizing radiation.

Inert atmospheric conditions such as nitrogen, argon, helium, neon, or vacuum are also used for sterilizing interfaces of in medical implants by ionizing radiation.

Inert atmospheric conditions also refer to an inert gas, inert fluid, or inert liquid medium, such as nitrogen gas or silicon oil.

The term "vacuum" refers to an environment having no appreciable amount of gas. A vacuum is used to avoid $O_2$. A vacuum condition can be used for sterilizing implants by ionizing radiation. A vacuum condition can be created using a commercially available vacuum pump. A vacuum condition also can be used when sterilizing interfaces in medical implants by ionizing radiation.

"Sterilization", one aspect of the present invention discloses a process of sterilization of medical implants containing PVA-hydrogels, such as PVA-PAAm-hydrogels. The process comprises sterilizing the medical implants by ionizing sterilization with gamma or electron beam radiation, for example, at a dose level ranging from about 25-70 kGy, or by gas sterilization with ethylene oxide or gas plasma.

Another aspect of the present invention discloses a process of sterilization of medical implants containing PVA-hydrogels, such as PVA-PAAm-hydrogels. The process comprises sterilizing the medical implants by ionizing sterilization with gamma or electron beam radiation, for example, at a dose level ranging from 25-200 kGy. The dose level of sterilization is higher than standard levels used in irradiation. This is to allow cross-linking or further cross-linking of the medical implants during sterilization.

The term "annealing" refers to heating the hydrogels below its peak melting point. Annealing time can be at least 1 minute to several days long. In one aspect the annealing time is about 4 hours to about 48 hours, preferably 24 to 48 hours and more preferably about 24 hours. "Annealing temperature" refers to the thermal condition for annealing in accordance with the invention. In certain embodiments, the term "annealing" refer as a type of thermal treatment.

The term "contact" includes physical proximity with or touching, mixing or blending of one ingredient with another. For example, a PVA solution in contacted with a PAAm solution, or a PVA solution is mixed with a AAm solution.

The term "hydrogel" or the term "PVA-hydrogels", as described herein, encompasses all PVA-based hydrogels, including "PVA-PAAm-hydrogels", "PVA-PAAm-PEG-hydrogels", and all other hydrogel compositions disclosed herein, including de-hydrated hydrogels. PVA-hydrogels are networks of hydrophilic polymers containing absorbed water that can absorb a large amounts of energy, such as mechanical energy, before failure.

The term "tough hydrogel", "tough PVA-hydrogel, or "tough PVA-PAA-hydrogel" refers to networks of hydrophilic polymers containing absorbed water that can absorb a large amounts of energy, such as mechanical energy, before failure.

The term "creep resistance" (adj. creep resistant) generally refers to the resistance to continued extension or deformation, which results from the viscoelastic flow of the polymer chains under continuous load.

The term "lubricity" (adj. lubricious) generally refers to a physical properties of a hydrogel, for example, it is a measure of the slipperiness of a hydrogel surface, which also relates to the hydrophilicity of the same surface.

Each composition and attendant aspects, and each method and attendant aspects, which are described above can be combined with another in a manner consistent with the teachings contained herein. According to the embodiments of the inventions, all methods and the steps in each method can be applied in any order and repeated as many times in a manner consistent with the teachings contained herein.

The invention is further described by the following examples, which do not limit the invention in any manner.

EXAMPLES

Determination of the Equilibrium Water Content (EWC) in a Hydrogel:

Following method was used to determine the equilibrium water content (EWC) in a hydrogel. The specimens were first immersed in saline solution with agitation for removal of any unbound molecules and for equilibrium hydration. To determine when the gels reached equilibrium hydration, their weight changes were recorded daily and the saline solution was replaced with fresh saline solution. After the equilibrium hydration level was reached, the equilibrium hydration weights of the specimens were recorded. Subsequently, the gel specimens were dried in an air convection oven at 90° C. until no significant changes in weight were detected. The EWC in a gel was then calculated by the ratio of the difference between the hydrated and dehydrated weights to the weight at equilibrated hydration state.

Example 1. Preparation of Polyvinyl Alcohol-Acrylamide IPNs

Method 1:

A 15 w/w % of polyvinyl alcohol (PVA, Molecular weight=115,000 g/mol) was prepared by dissolving PVA in deionized (DI) water at 90° C. by constant stirring. After formation of a clear PVA solution, the solution was cooled down to 40° C. Acrylamide monomer and azobisisobutyronitrile initiator were dissolved in water (initiator was (1 mol % of acryl amide monomer). This acrylamide-initiator solution was added to the PVA solution in a reaction vessel and it was first pre-polymerized in the reaction vessel for 2 hours at 45° C. The resulting viscous solution was poured into a hot glass mold and sealed with a glass cover; then the mold was sandwiched between two stainless steel blocks. This mold was further polymerized using two thermal methods. In the first method, pre-polymerized and molded PVA-AAm-initiator system was put in a convection oven at 90° C. In the second method, sandwiched PVA-AAm-initiator system was polymerized first at 55° C. for 2 hours then at 65° C. for 4 hours. In both methods, polymerized PVA-AAm system was then placed in a −17° C. freezer for 16 hours, and subsequently thawed for 8 hours. In some cases this freeze-thaw process was repeated for five cycles. Upon removal from the mold, the hydrogel sheet was placed in water to remove the un-reacted acrylamide monomer and stirred continuously by changing the water daily until no trace monomer was detected by ultra violet-visible (uv-vis) spectrophotometer. One specimen was placed in DI water to determine the swelling behavior and equilibrium water content of the polyvinyl alcohol-acrylamide IPN. The weight and dimensional changes of the sample were recorded until the equilibrium was reached. Five, 10, 15, 20 and 30% acrylamide concentrations were studied and the concentrations were calculated based on the following formula: % acrylamide=(weight of acrylamide/(weight of acrylamide+total water in PVA-Acrylamide solution)). This method maybe modified by changing the concentration of PVA, and initiator, and polymerization temperature and the number of freeze-thaw (FT) cycles.

Method 2:

Another approach to the IPN preparation is to freeze-thaw the PVA-monomer-initiator mixture prior to the polymerization step. To demonstrate this path, polyvinyl alcohol-acrylamide-initiator solution in water (prepared by the method described above) was first subjected to freeze-thaw cycles then polymerized at 65° C. to 90° C. for 4 hours. The resulting polymer was placed in water for removal of unreacted acrylamide monomer by stirring continuously and changing the water daily until no trace monomer was detected by uv-vis in the water. One specimen was placed in DI water to determine the swelling behavior and equilibrium water content of the polyvinyl alcohol-acrylamide IPN. The weight and dimensional changes of the sample were recorded until the equilibrium was reached. This method maybe modified by changing the ratios of PVA, acrylamide, and initiator, and polymerization temperature and the number of FT cycles.

Method 3:

In another method, 15% (w/w) of polyvinyl alcohol solution was prepared by above described method and poured into a hot glass mold and sealed with a glass cover. The mold was then placed in a −17° C. freezer for 16 hours, and subsequently thawed for 8 hours. After one freeze-thaw cycle, the resulting gel was immersed into an acrylamide-initiator-water solution (azobisisobutyronitrile, (AIBN) or ammonium persulfate (APS)). After this process a swollen gel matrix was formed. The swollen gel was polymerized at 90° C. with AIBN as the initiator or 65° C. with APS as the initiator. Post polymerization was carried out for 4 hours and resulting gel was placed in water for removal of unreacted acrylamide monomer by stirring continuously and changing the water daily until no trace monomer was detected by uv-vis. One specimen was placed in DI water to determine the swelling behavior and equilibrium water content of the polyvinyl alcohol-acrylamide IPN. The weight and dimensional changes of the sample were recorded until the equilibrium was reached. This method maybe modified by changing the concentration of PVA, acrylamide, initiator, polymerization temperature, freeze-thaw (FT) cycle and molecular weight of PVA.

Method 4:

In another method, 15% (w/w) PVA solution was prepared by dissolving PVA in deionized water at 90° C. while stirring continuously. Polyethylene glycol (PEG, MW-400 g/mol) was added to the PVA solution while stirring at 90° C. PEG concentration was kept at 28%, which was calculated based on the following formula: % PEG=(weight of PEG/weight of PEG and water). The resulting PVA-PEG solution was centrifuged to remove air bubbles and poured into a heated glass mold kept at 90° C. The mold was covered by a glass cover kept at 90° C. and was sandwiched between two hot stainless steel blocks. The sandwiched mold was kept at room temperature for 24 hours and allowed to cool down and thus the PVA-PEG solution formed a gel. The resulting gel was immersing in deionized water room temperature on a rotary shaker for at least 7 days for the completion of dePEGing. Equilibrium dePEGing was determined by periodically weighing the gels. DePEGed PVA gel was then immersed in acrylamide-water-initiator solution (azobisisobutyronitrile, (AIBN) or ammonium persulfate (APS)). Thus, the water in the gel was replaced with acrylamide-initiator solution. The resulting matrix was polymerized at 90° C. with AIBN as the initiator or 65° C. with APS as the initiator. Post polymerization was carried out for 4 hours and resulting gel was placed in water for removal of unreacted acrylamide monomer by stirring continuously and changing the water daily until no trace monomer was detected by uv-vis. One specimen was placed in DI water to determine the swelling behavior and equilibrium water content of the polyvinyl alcohol-acrylamide IPN. The weight and dimensional changes of the sample were recorded until the equilibrium was reached. This method maybe modified by changing the concentration of PVA, PEG, acrylamide, initiator, polymerization temperature and molecular weight of PVA and PEG.

The gels from methods 1-4 can be subjected to an additional step such additional freeze-thaw, solvent dehydration, vacuum dehydration, annealing subsequent to dehydration, irradiation (UV light, gamma or e-beam) to introduce cross-links (in the presence of cross-linking agent like methylene bis acrylamide) and/or crystalline regions into network to toughen the hydrogels or melting after irradiation.

Method 5:

In another method, PVA-AAm IPNs can be made by mixing PVA solution and AAm solution (see Method 1) and irradiating mixture solution with or without an initiator to form a slightly cross-linked network structure. Additional freeze-thaw steps can be applied. To increase the toughness of this irradiated and freeze-thawed network even further, a dehydration process followed by high temperature annealing can be applied. Resulting gel can be rehydrated to equilibrium either in DI or saline.

Method 6:

A 15 w/w % of polyvinyl alcohol (PVA, Molecular weight=115,000 g/mol, Scientific Polymer Products, Ontario, N.Y.) was prepared by dissolving PVA in deionized water at 90° C. by constant stirring. After formation of a clear PVA solution, acrylamide (5%, 10%, and 15%) monomer and 1:3 ratio of azobisisobutyronitrile, (AIBN) and ammonium persulfate (APS) with the total initiator concentration at 0.1% of AAm monomer were added to this solution. The amount of the AAm monomer was calculated based on the following formula % AAm=(weight of AAm/weight of AAm and water). The resulting solution was pre-polymerized at 45° C. then poured into a glass mold. The solution was placed in a −17° C. freezer for 16 hours then thawed for 8 hours followed by an 8 hour polymerization process by heating to 45° C. for at least 2 hours followed by heating to 55° C. for at least 4 hours. The polymerized IPN was then placed in a −17° C. freezer for 16 hours with a subsequent 8 h thawing. Upon removal from the mold, the hydrogel sheet was placed in water to remove the unreacted acrylamide monomer and stirred continuously by changing the water daily until equilibrium.

Example 2. Dehydration and Annealing of Polyvinyl Alcohol-Acrylamide IPNs

Upon removal of un-reacted monomer, one sheet of the IPNs from Example 1 was kept in DI as control while two sheets of IPN hydrogels were dehydrated in vacuum at room temperature until equilibrium was reached, which was determined by daily measurement of weight and dimensional changes. Subsequent to vacuum dehydration, one sample was annealed under argon gas partial pressure of 500 mmHg in a vacuum oven at 160° C.; for this, the sample was placed in an oven already heated to 160° C., vacuum was pulled and the chamber was back filled with argon gas until a pressure of 500 mmHg and the sample was kept in the oven for one hour. The weight and dimensions of the specimen were recorded before and after annealing. After annealing, the gel was immersed in DI water until equilibrium re-hydration was attained. The weight and dimension of the samples were recorded daily.

Example 3. Preparation of PVA-PAAm Blends

A 15 g of polyvinyl alcohol (PVA, Molecular weight=115,000 g/mol) was dissolved in 50 g of deionized water at 90° C. by constant stirring. After the formation of a clear PVA solution, it was cool down to 40° C. 51 g of PAAm (MW=1500 g/mol) solution (prepared by dissolving 1 g of PAAm in 50 g of water) was added to this solution and stirred until it formed a clear solution. The PVA-PAAm solution was poured into a hot glass mold and sealed with a glass cover. The mold was then placed in a −17° C. freezer for 16 hours between two stainless steel blocks, and thawed for 8 hours. This freeze-thaw process was repeated for five cycles. Upon removal from the mold, the hydrogel sheet was immersed in water and stirred until equilibrium re-hydration was reached. The weight and dimensional changes of the sample were recorded until the equilibrium was achieved.

The PVA-PAAm solutions/blends also can be cross-linked by irradiating with or without an initiator. Additional freeze-thaw step can be applied to this cross-linked PVA-PAAm blend. To increase the toughness of this irradiated and freeze-thawed network even further, a dehydration process followed by high temperature annealing can be applied. Resulting gel can be rehydrated to equilibrium either in DI or saline.

TABLE 1

Observations for various PVA-PAAm blends and IPNs prepared at 90° C. polymerization and freeze-thaw.

| PVA-PAAm IPN | Observation |
|---|---|
| 15/15 | Tough after both 1 and 5 times freeze-thaw |
| 15/20 | Tough after both 1 and 5 times freeze thaw but softer then 15/15 |
| 15/30 | Softer then 15/15 |
| PVA-PAAm Blend (MW AAm = 1500 g/mol) | |
| 15/1 | Softer than IPN |
| 15/15 | Tough after both 1 and 5 times freeze-thaw |

Example 4. Dehydration and Annealing of IPNs and Blends of PVA-PAAm

PVA-PAAm hydrogel sheets from Example 3 were dehydrated in vacuum at room temperature until equilibrium, which was determined by daily measurement of weight and dimensional changes. Subsequent to vacuum dehydration, one sample was annealed under argon gas partial pressure of 500 mm Hg in a vacuum oven at 160° C.; for this the sample was placed in an oven already heated to 160° C., vacuum was pulled and the chamber was back filled with argon gas until a pressure of 500 mmHg and the sample was kept in the oven for one hour. The weight and dimensions of the specimen were recorded before and after annealing. After annealing, the gel was immersed in DI water until an equilibrium re-hydration was achieved. The weight and dimension of the samples were recorded daily. The PVA-AAm IPNs prepared by Method 6 were first dried in a convection oven at 25° C. for 14 hours, ramped to 80° C. in 8 hours, then kept at 80° C. for 20 hours prior to annealing. Annealing was carried out under a 500 mmHg argon partial pressure at 160° C. for 1 hour in a vacuum oven. The annealed gels were rehydrated in DI water until they reached equilibrium.

Example 5. Equilibrium Water Content (EWC) of PVA-PAAm IPNs

The PVA-PAAm IPNs were first equilibrated in DI water solution at room temperature. The weight and dimensional changes of the gels were recorded daily and the DI water solution was replaced with fresh DI water solution until equilibrium hydration. Subsequently, the gel specimens were dried under vacuum for one day and put in an air convection oven at 90° C. The EWC was calculated by the ratio of the difference between the hydrated and dehydrated weights and the weight at equilibrium hydration state. Tables 2 and 3 show the EWC values of IPNs prepared by the 90° C. polymerization method (Method 2) and the two-step polymerization at 55° C. and 65° C. (Method 1). FIG. 1 shows the EWC values of the PVA-AAm IPNs prepared by step polymerization method (Method 6). In the IPNs, the EWC increased with increasing PAAm content. Also, decreasing the polymerization temperature resulted in higher EWC values.

TABLE 2

The EWC values for the PVA-PAAm IPN samples prepared by 90° C. polymerization and one freeze-thaw cycle, as described in the text.

| PVA-PAAm IPN samples* | EWC values |
|---|---|
| 15% PVA-0% PAAm | 35.4 ± 0.2 |
| 15% PVA-10% PAAm | 58.1 ± 2.3 |
| 15% PVA-15% PAAm | 67.5 ± 1.25 |
| 15% PVA-20% PAAm | 76.8 ± 0.25 |
| 15% PVA-30% PAAm | 79.8 ± 2.71 |

*All samples were vacuum dehydrated, annealed at 160° C. for one hour and re-hydrated in DI.

TABLE 3

The EWC values for the PVA-PAAm samples. The IPNs were prepared by the two step polymerization at 55° C. and 65° C. and one cycle freeze-thaw, as described in the text.

| PVA-PAAm IPN samples | EWC values |
|---|---|
| 15% PVA-0% PAAm non-annealed control in DI | |
| 15% PVA-0% PAAm annealed and rehydrated in DI | 35.4 ± 0.2 |
| 15% PVA-5% PAAm non-annealed control in DI | 84.5 ± 1.6 |
| 15% PVA-5% PAAm vacuum dehydrated and rehydrated in DI | 70.9 ± 0.2 |
| 15% PVA-5% PAAm vacuum dehydrated, annealed and rehydaretd in DI | 34.0 ± 0.5 |
| 15% PVA-10% PAAm non-annealed control in DI | 86.0 ± 0.9 |
| 15% PVA-10% PAAm vacuum dehydrated and rehydrated in DI | 83.2 ± 0.1 |
| 15% PVA-10% PAAm vacuum dehydrated, annealed and rehydaretd in DI | 59.0 ± 0.3 |
| 15% PVA-15% PAAm - non-annealed control in DI | 88.0 ± 0.3 |
| 15% PVA-15% PAAm vacuum dehydrated and rehydrated in DI | 87.5 ± 0.2 |
| 15% PVA-15% vacuum dehydrated and rehydrated in DI | 84.1 ± 0.3 |

Example 6: Creep Behavior of PVA-PAAm IPNs

Hydrogel sheets form the above examples were cut with a 17 m diameter trephine and were allowed to equilibrate in DI water solution at 40° C. for 24 hours prior to the start of the creep test.

The hydrogel creep test was done on a MTS (Eden Prairie, Minn.) 858 Mini Bionix servohydraulic machine. Cylindrical hydrogel specimens, approximately 17 mm in diameter and between 5-10 mm in height, were placed between stainless steel compression plates for testing. Prior to the start of the test, the top and bottom compression plates were brought together and the LVDT displacement was zeroed at this position. After placing the specimen on the bottom plate, the top plate was lowered until it made contact with the top surface of the creep specimen. The displacement reading from the LVDT on the MTS was recorded as the initial height of the specimen.

Figure 2:
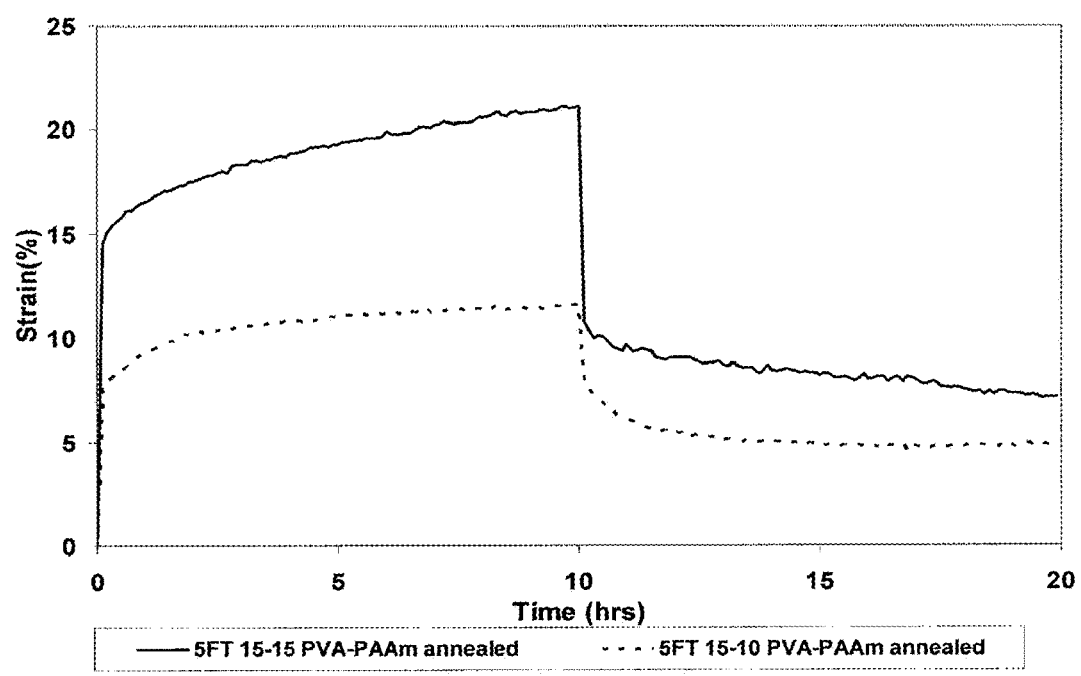
FIG. 2 shows creep behavior of Polyvinyl alcohol-acrylamide IPNs prepared by Method 1 followed by annealing and re-hydration.
Figure 3:
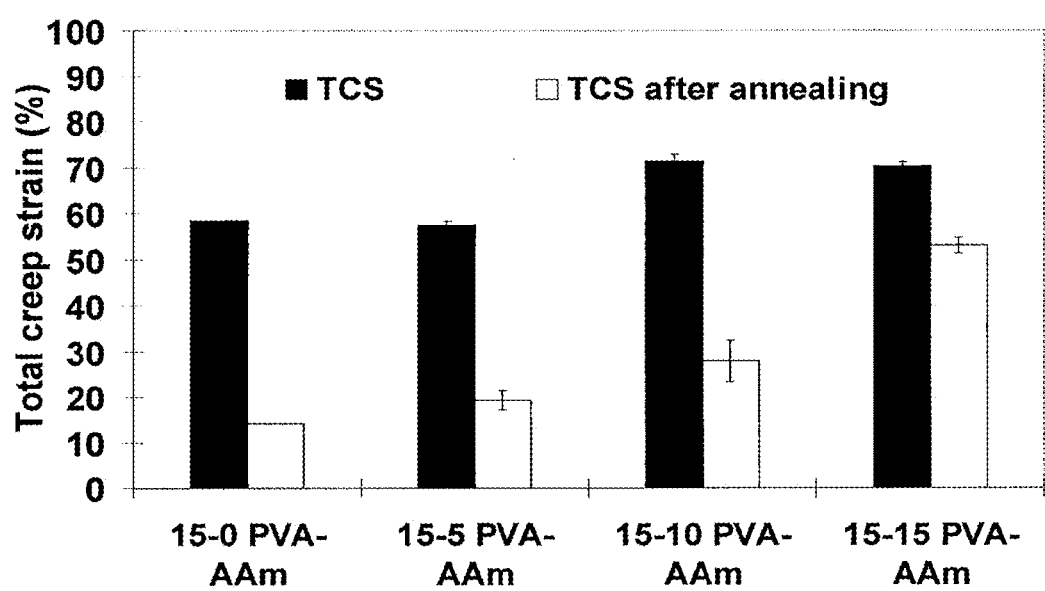
FIG. 3 shows creep behavior of Polyvinyl alcohol-acrylamide IPNs prepared by Method 6 followed by re-hydration.

The compressive load was initially ramped at a rate of 50 N/min to a creep load of 100 N. This load was maintained constant for 10 hours. The load was subsequently reduced at a rate of 50 N/min to a recovery load of 10 N and was held there for 10 hours. See FIG. 2 for the creep behavior of PVA-AAm IPNs prepared by Method 1. Creep behavior of Polyvinyl alcohol-acrylamide IPNs after annealing and rehydration. Increase in the AAm concentration resulted in decrease in the creep resistance. FIG. 3 shows the creep behavior of the PVA-AAm IPNs prepared by Method 6 before and after annealing in their rehydrated form. For all formulations annealing markedly improved the creep resistance.

Example 7. Determining Pore Structure of PVA-PAAm IPNs and Blends by Confocal Laser Scanning Microscopy (CLSM)

The microstructure of hydrogel specimens in their hydrated state was imaged using confocal laser scanning microscopy. Thin sections were cut from the central bulk region of each hydrogel specimen using a razor blade. Each cut section was placed in a vial with 1.8 ml of 0.15M aqueous solution of sodium bicarbonate (Aldrich) at pH 9.0 for at least 2 days with agitation. The fluorochrome dye reagent was prepared by dissolving 5 mg of 5-(4,6-dichlorotriazinyl)amino fluorescein) (5-DTAF, Invitrogen, Carlsbad, Calif.) in 1.0 ml anhydrous dimethylformamide. 0.1 ml of the dye reagent was added to each sample vial while stirring and the samples were kept at 4° C. for incubation for 1 hour with stirring. After reaction, the hydrogel specimens were rinsed with DI water solution several times to remove non-reacted dye molecules. Hydrogel specimens were imaged by a Zeiss LSM 510 system, with a 488 nm spectral band Argon laser for fluorochrome excitation and a 520 nm band pass filter for detection.

Figure 4:
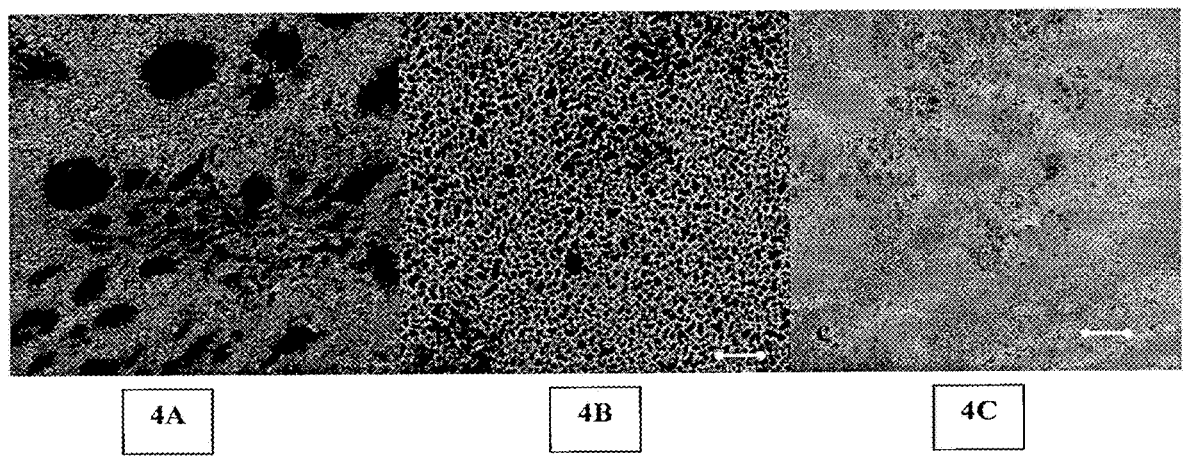
FIGS. 4A-4C depict the confocal images of PVA-PAAm IPNs 15% PVA-15% PAAm, vacuum dehydrated, annealed and re-hydrated in DI water.

FIG. 4 shows the confocal images of PVA-PAAm IPNs prepared as described in Example 1. The 90° C. polymerized IPNs were not homogeneuous (see FIG. 2A) and had smaller pores compared to the two step polymerized (55° C. and 65° C.) IPNs (see FIG. 2B). IPNs depicted in FIGS. 2B and 2C were prepared by the same two-step polymerization methods except that the IPN shown in FIG. 2C had a lower AAm concentration. The difference in porosity and pore morphology between FIGS. 2A and 2C suggest that to get a homogeneous gel with relatively bigger pores AAm concentration may need to be kept higher than 10%.

FIGS. 4A, 4B and 4C illustrate confocal images of PVA-PAAm IPNs. The IPNs were vacuum dehydrated, annealed and rehydrated in DI: 2A) 15% PVA/15% PAAm with 90° C. degree polymerization; 2B) 15% PVA/15% PAAm with two step polymerization at 55° C. and 65° C.; and 2C) 15% PVA-10% PAAm with two step polymerization (the scale bar is 10 μm). The confocal images of non-annealed IPNs prepared by Method 6 did not show well defined porous gel structures. The annealed form of the same hydrogels showed more visible porous structures with higher AAm content (FIGS. 5 and 6).

Figure 7:
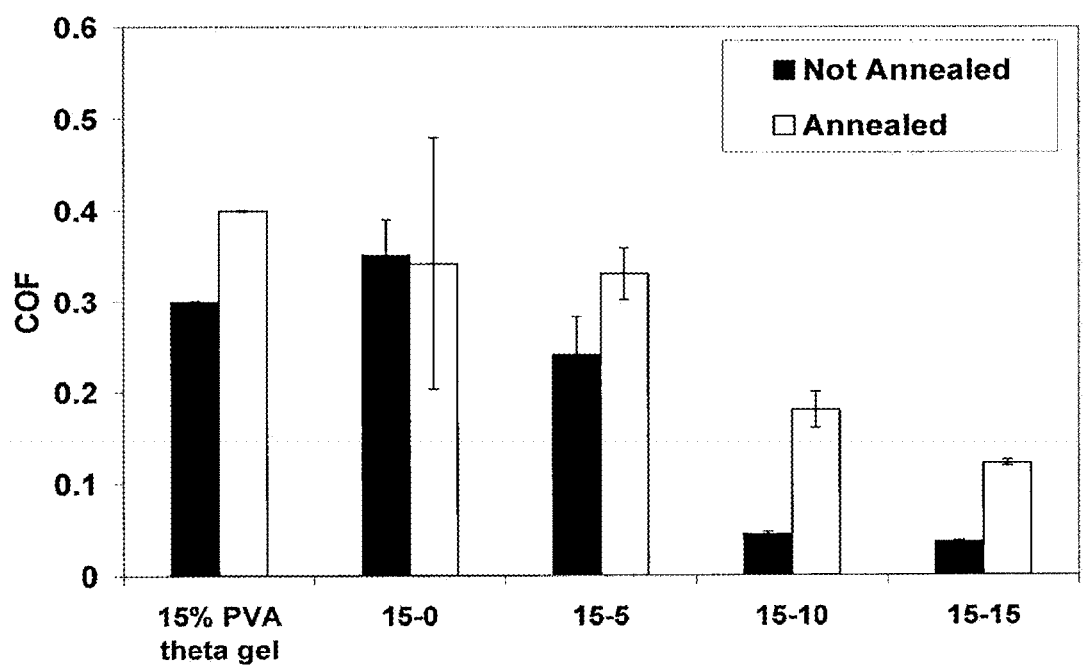
FIG. 7 shows RCOF comparison of vacuum dehydrated, annealed and re-hydrated PVA prepared by Theta gels method and the PVA/AAm IPNs, prepared by Method 6.

Example 8. Determining Coefficient of Friction (COF) of PVA-PAAm IPNs and Blends by Rheometer Relative coefficient of friction (RCOF) of the PVA-AAm IPNs was determined in DI water at 40° C. against an implant-quality finish cobalt-annular fixture mounted on a controlled stress rheometer (AR-2000, TA Instruments) with an inner radius of 0.72 cm and a contact area of 0.36 cm$^2$ at a constant angular velocity of 0.1 rad/s. The samples were equilibrated in DI water at 40° C. for 1 day prior to the test. Torque, normal force, and velocity data were recorded for 90 seconds at 1, 3, 5 and 7 N with 2 minutes equilibration at the given load in between the runs from low to high loading. The COF between the IPN and the counterface was calculated using the method of Kavehpour and McKinley (see Kavehpour, H. P. and McKinley, G. H., *Tribology Letters*, 17(2), pp. 327-335, 2004). The COF was measured by averaging the reading over 90 s of load application. FIG. 7 shows the RCOF comparison of vacuum dehydrated, annealed and rehydrated 15/28 PVA/PEG gel prepared by theta gel method (see Bodugoz-Senturk, et. al. Biomaterials 29 (2) 141-149, 2008) and PVA-PAAm IPN in DI water. PVA-AAm showed lower COF compared to the annealed PVA theta gel. Increasing AAm content resulted in lower RCOF.

Example 9. Determining Tear Strength of PVA-PAAm IPNs

Figure 8:
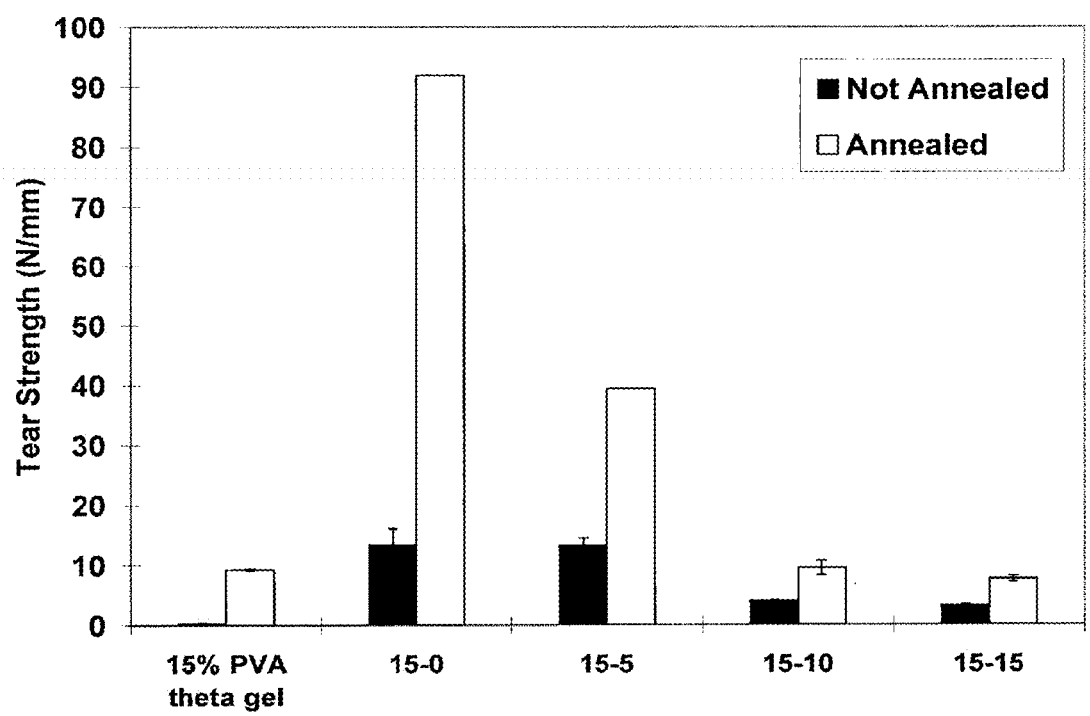
FIG. 8 shows tear strength of vacuum dehydrated, annealed and re-hydrated PVA prepared by Theta gels method and the PVA/AAm IPNs, prepared by Method 6.

The tear strength of the PVA-AAm and PVA-PEG gels was also measured after the above described processing steps using Instron Insight 2 (MTS) machine. Test samples for tear strength were cut from the sheets using a 10 cm long C type die 10 cm in length. The samples were then placed in the wedge grips of the testing machine by clamping about 2 cm of either ends of the sample length to minimize slippage within the grips during testing. The samples were deformed in tension at a rate of 20 in/min per ASTM D624. FIG. 8 shows the tear strength comparison of vacuum dehydrated, annealed and rehydrated 15/28 PVA/PEG gel prepared by theta gel method (see Bodugoz-Senturk, et. al. Biomaterials 29 (2) 141-149, 2008) and PVA-PAAm IPN in DI water. For both PVA-PEGgels and PVA-AAm IPNs annealing significantly improved the tear strength. Increasing AAm content resulted in lower tear strength. PVA-AAm IPNS with high AAm content showed similar tear strength compared to the annealed PVA theta gel.

It is to be understood that the description, specific examples and data, while indicating exemplary embodiments, are given by way of illustration and are not intended to limit the present invention. Various changes and modifications within the present invention will become apparent to the skilled artisan from the discussion, disclosure and data contained herein, and thus are considered part of the invention.

What is claimed is:

1. A method of making a creep resistant, lubricious and tough PVA-PAAm-hydrogel comprising:
   (a) contacting an aqueous solution of poly(vinyl alcohol) (PVA) with an aqueous solution of acrylamide monomer (AAm) in presence of an initiator, thereby forming a PVA-AAm solution;

(b) heating or irradiating the PVA-AAm solution, thereby forming an interpenetrating network (IPN) structure of polymerized PAAm in the PVA solution; and
(c) subjecting the PVA-PAAm IPN to one or more freeze-thaw cycles, thereby forming a tough PVA-PAAm hydrogel,
wherein the PVA-PAAm-hydrogel has a PVA-PAAm weight ratio of 1:1 to 1:2, and the aqueous solution of acrylamide monomer comprises 5% to 30% of the acrylamide monomer wherein % acrylamide monomer equals a weight of acrylamide monomer/(the weight of acrylamide monomer+total water in PVA-AAm solution).

2. The method of claim 1 further comprising:
(d) dehydrating the tough PVA-PAAm hydrogel in a vacuum, thereby increasing the melting point of the PVA-PAAm hydrogel;
(e) annealing the dehydrated PVA-PAAm hydrogel at a temperature below the melting point of the dehydrated PVA-PAAm hydrogel; and
(f) re-hydrating the PVA-PAAm hydrogel, thereby forming a creep resistant, lubricious and tough PVA-PAAm-hydrogel.

3. The method of claim 1, wherein the PVA-AAm solution is heated at a temperature below the boiling point of the PVA-AAm solution, thereby forming an inter-penetrating network (IPN) structure of polymerized PAAm in the PVA solution.

4. The method of claim 1, wherein the PVA-AAm solution is heated at a temperature between about 40° C. and 45° C., thereby forming an interpenetrating network (IPN) structure of polymerized PAAm in the PVA solution.

5. The method of claim 1, wherein the PVA-AAm solution is irradiated, thereby forming an inter-penetrating network (IPN) structure of polymerized PAAm in the PVA solution.

6. The method of claim 1, further comprising dehydrating the PVA-PAAm hydrogel under an inert environment or in a dehydrating solvent.

7. The method of claim 1, further comprising dehydrating the PVA-PAAm hydrogel by immersing in a PEG solution to allow diffusion of the PEG into the PVA-PAAm-hydrogel.

8. The method of claim 6, further comprising annealing the dehydrated PVA-PAAm hydrogel at a temperature about 80° C. to about 200° C., for about an hour or less to a few weeks.

9. The method of claim 8, further comprising rehydrating the PVA-PAAm hydrogel by soaking in a saline solution or in water.

10. The method of claim 1, wherein the freeze-thaw step is repeated for at least 1 to 100 cycles.

11. The method of claim 1, further comprising dehydrating the PVA-PAAm hydrogel to remove part or all of the water content.

12. The method of claim 1, further comprising dehydrating the PVA-PAAm hydrogel by a method comprising the steps of:
(c) contacting the PVA-PAAm hydrogel with an organic solvent, wherein the PVA-PAAm hydrogel comprises a polymer which is not soluble in the solvent, and wherein the solvent is at least partially miscible in water;
(d) heating the PVA-PAAm hydrogel to a temperature below or above the melting point of the PVA-PAAm hydrogel; and
(e) cooling the heated PVA-PAAm hydrogel to room temperature.

13. The method of claim 1, further comprising dehydrating the PVA-PAAm hydrogel by a method comprising the steps of:
(c) contacting the PVA-PAAm hydrogel with an organic solvent, wherein the hydrogel comprises a polymer which is not soluble in the solvent, and wherein the solvent is at least partially miscible in water; and
(d) air-drying the PVA-PAAm hydrogel at room temperature.

14. The method of claim 1, further comprising dehydrating the PVA-PAAm hydrogel by a method comprising the steps of:
(c) contacting the PVA-PAAm hydrogel with an organic solvent, wherein the PVA-PAAm hydrogel comprises a polymer which is not soluble in the solvent, and wherein the solvent is at least partially miscible in water; and
(d) subjecting the PVA-PAAm hydrogel to at least one freeze-thaw cycle and allowing the PVA-PAAm hydrogel to warm-up room temperature.

15. The method of claim 1, further comprising dehydrating the PVA-PAAm hydrogel by placing the PVA-PAAm hydrogel in:
(a) a non-solvent, wherein i) the non-solvent is PEG, alcohols, acetones, saturated salinated water, vitamin, or carboxylic acid, aqueous solution of a salt of an alkali metal, and ii) the non-solvent contains more than one ingredient including water, PEG, vitamin, polymer, ester, proteoglycan, and carboxylic acid, or
(b) in a supercritical fluid.

16. The method of claim 11, further comprising rehydrating the dehydrated PVA-PAAm hydrogel by placing the dehydrated PVA-PAAm hydrogel: i) in water, saline solution, Ringer's solution, salinated water, or buffer solution, or ii) by placing the dehydrated PVA-PAAm hydrogel in a humid chamber, or iii) by placing the dehydrated PVA-PAAm hydrogel at room temperature or at an elevated temperature.

17. The method of claim 1, wherein the method further comprises a step of heating the PVA-PAAm to a temperature about 40° C. to about 200° C. or more.

18. The method of claim 11, further comprising rehydrating the dehydrated PVA-pAAm hydrogel to reach an equilibrium.

19. The method of claim 1, wherein the tough PVA-PAAm hydrogel is a medical implant.

* * * * *